US 8,805,428 B2

(12) United States Patent
Lang et al.

(10) Patent No.: US 8,805,428 B2
(45) Date of Patent: Aug. 12, 2014

(54) COOPERATIVE SPECTRUM SENSING IN COGNITIVE RADIO NETWORKS

(75) Inventors: Ke Lang, Beijing (CN); Yuan Wu, Hong Kong (CN); Danny Hin Kwok Tsang, Hong Kong (CN)

(73) Assignee: Dynamic Invention LLC, Victoria, Mahe (SC)

( * ) Notice: Subject to any disclaimer, the term of this patent is extended or adjusted under 35 U.S.C. 154(b) by 746 days.

(21) Appl. No.: 13/076,088

(22) Filed: Mar. 30, 2011

(65) Prior Publication Data

US 2012/0108276 A1     May 3, 2012

Related U.S. Application Data

(60) Provisional application No. 61/407,425, filed on Oct. 27, 2010.

(51) Int. Cl.
*H04B 7/00*     (2006.01)
*H04W 72/04*     (2009.01)

(52) U.S. Cl.
CPC .................................. *H04W 72/04* (2013.01)
USPC ........... 455/509; 455/446; 455/447; 455/448; 455/449; 455/450

(58) Field of Classification Search
USPC .................. 455/509, 516, 446–455
See application file for complete search history.

(56) References Cited

U.S. PATENT DOCUMENTS

| | | | | |
|---|---|---|---|---|
| 2009/0207735 | A1* | 8/2009 | Letaief et al. ................. | 370/237 |
| 2010/0173586 | A1* | 7/2010 | McHenry et al. ............... | 455/62 |
| 2010/0220707 | A1* | 9/2010 | Teo et al. ...................... | 370/343 |
| 2010/0248769 | A1* | 9/2010 | Li et al. ......................... | 455/509 |
| 2010/0279725 | A1* | 11/2010 | Muraoka et al. ............... | 455/509 |
| 2010/0329180 | A1* | 12/2010 | Rao et al. ....................... | 370/328 |
| 2011/0014936 | A1* | 1/2011 | Kim ............................... | 455/509 |
| 2011/0074387 | A1* | 3/2011 | Zhuang .......................... | 324/76.19 |
| 2012/0108276 | A1* | 5/2012 | Lang et al. ..................... | 455/501 |
| 2012/0195212 | A1* | 8/2012 | Zhang et al. ................... | 370/252 |
| 2012/0309442 | A1* | 12/2012 | Nentwig ........................ | 455/509 |

OTHER PUBLICATIONS

Akyildiz, I.F., Lee, W.-Y., Vuran, M.C., Mohanty, S.: Next generation/dynamic spectrum access/cognitive radio wireless networks: A survey. Comput. Netw.: Int. J. Comput. Telecommun. Netw. vol. 50, No. 13, pp. 2127-2159 (2006).

Haykin, S.: Cognitive radio: Brain-empowered wireless communications. IEEE J. Sel. Areas Commun., vol. 23, No. 2, pp. 201-220 (2005) http://soma.mcmaster.ca/papers/slides_haykin_rim_2008.pdf.

(Continued)

*Primary Examiner* — Fayyaz Alam

(74) *Attorney, Agent, or Firm* — Amin, Turocy & Watson, LLP

(57) ABSTRACT

Providing for cooperative sensing in wireless communications that improves user terminal throughput and minimizes interference is described herein. According to some aspects, a network entity, such as a base station, can assign a set of SUTs to measure a subset of wireless channels in a target frequency according to a cooperative sensing arrangement. In particular aspects, this assignment can be implemented so as to increase or maximize potential traffic throughput of those SUTs within the target frequency, in a given wireless time slot. In this manner, cooperative sensing can be structured so as to provide more efficient traffic communications within the target frequency.

41 Claims, 11 Drawing Sheets

(56) References Cited

OTHER PUBLICATIONS

Cordeiro, C., Challapali, K., Birru, D., Shankar, S.: IEEE 802.22: The First World-wide Wireless Standard based on Cognitive Radios. J. Commun. vol. 1, No. 1, pp. 60-67 (2006).

Mishra, S.M., Sahai, A., Brodersen, R.W.: Cooperative Sensing among Cognitive Radios. In: Proc. IEEE Int. Conf. Commun., Turkey, vol. 4, pp. 1658-1663 (2006) citeseerx.ist.psu.edu/viewdoc/download?doi=10.1.1.127 . . .

Letaief, K.B., Zhang, W.: Cooperative Spectrum Sensing. Book chapter in Cognitive Wireless Communication Networks. Springer, pp. 115-138 (2007).

Zhang, W., Letaief, K. B.: Cooperative Spectrum Sensing with Transmit and Relay Diversity in Cognitive Radio Networks. IEEE Trans. Wireless Commun. vol. 7, No. 12, pp. 4761-4766 (2008).

Zhao, Q., Tong, L., Swami, A., Chen, Y.: Decentralized Cognitive MAC for Opportunistic Spectrum Access in Ad Hoc Networks: A POMDP Framework. IEEE J. Sel. Areas Commun. vol. 25, No. 3 (2007) http://www.ece.ucdavis.edu/~qzhao/ZhaoEtal07JSAC.pdf.

Chen, Y., Zhao, Q., Swami, A.: Joint design and separation principle for opportunistic spectrum access in the presence of sensing errors. IEEE Trans. Inf. Theory. vol. 54, No. 5, pp. 2053-2071 (2008).

Hoang, A.T., Liang, Y.C., Wong, D.T.C., Zeng, Y.H., Zhang, R.: Opportunistic Spectrum Access for Energy-Constrained Cognitive Radios. IEEE Trans. Wireless Commun. vol. 8, No. 3 (2009).

Cassandra, A., Littman, M.L., Zhang, N.L.: Incremental Pruning: A simple, Fast, Exact Method for Partially Observable Markov Decision Processes. In: Proc. 13th Conf. Uncertainty in Artificial Intelligence (UAI), Providence RI, pp. 54-61 (1997) http://citeseerx.ist.psu.edu/viewdoc/summary?doi=10.1.1.32.9821.

Lee, W.-Y., Akyildiz, I.F.: Optimal Spectrum Sensing Framework for Cognitive Radio Networks. IEEE Trans. Wireless Commun. vol. 7, No. 10 (2008) http://www.iust.ac.ir/files/dept_ce/azhari_0a944/adv_computer_network/Optimal-Spectrum-Sensing-Framework-for-Cognitive-Radio-Networks.pdf.

Kim, H., Shin, K.G.: Efficient Discovery of Spectrum Opportunities with MAC-Layer Sensing in Cognitive Radio Networks. IEEE, Trans. Mobile Computing. vol. 7, No. 5 (2008).

Digham, F.F., Alouini, M.-S., Simon, M.K.: On the Energy Detection of Unknown Signals over Fading Channels. In: Proc. IEEE ICC 2003, vol. 5, pp. 3575-3579 (2003).

\* cited by examiner

COOPERATIVE SPECTRUM SENSING IN COGNITIVE RADIO NETWORKS

CLAIM OF PRIORITY UNDER 35 U.S.C §119

The present Application for Patent claims priority to Provisional Patent Application Ser. No. 61/407,425 entitled "HOW TO OPTIMALLY SCHEDULE COOPERATIVE SPECTRUM SENSING IN COGNITIVE RADIO NETWORKS" and filed Oct. 27, 2010, assigned to the assignee hereof and hereby expressly incorporated by reference herein.

TECHNICAL FIELD

The present application relates generally to cognitive radio communication networks and more specifically to providing centrally managed cooperative channel sensing in a cognitive radio communication environment.

BACKGROUND

In modern wireless communications, most wireless networks operate on a particular licensed or unlicensed wireless frequency. Different types of wireless communications, such as cellular communications, paging communications, amateur radio communications, and so on, have different frequency spectra assigned as standard frequencies for electronic devices employing these types of communications. Different states or national governments might modify these frequencies within their jurisdictions to some extent, but generally the frequency employed for a given wireless system, IEEE 802.11 local area networks for instance, will be the same worldwide.

As some modes of wireless communications have become increasingly popular, their associated frequency spectra have become increasingly crowded. As an example, the frequency spectrum generally employed by cellular telephone communications is far more crowded than that employed by amateur radio, due to the relative popularities of these two forms of wireless communication. As a result, some frequency spectra become highly congested, whereas others are relatively free. This imbalance in utilization of various frequency spectra has lead to a very inefficient use of the overall radio frequency spectrum.

Cognitive radio was first proposed as a mechanism for providing a more intelligent and adaptive paradigm for wireless communication. This mechanism looked to leverage the relatively ubiquitous smart-phone type mobile communication devices having sophisticated software logic to accomplish adaptive and dynamic wireless communications. Initial proposals for cognitive radio envisioned computer to computer communications sufficiently refined to detect user communication needs as a function of use context, and deliver radio resources or wireless services configured particularly for those needs. This model could theoretically result in a software-defined radio platform that could eventually evolve into a fully reconfigurable wireless system that adapts its communication variables in response to network and user demands.

Although many conceptual proposals for cognitive radio are yet to achieve any realization, those addressing frequency spectra utilization have already been initiated. This is largely because the inefficient use of radio frequencies has become such an immediate and multi-faceted problem. For instance, fixed spectrum allocation for systems like cellular networks, prevent rarely used frequencies (e.g., assigned to specific services) from being used by unlicensed users. This is so even where additional transmissions on those frequencies would not interfere with the assigned service.

One of the first applications of cognitive radio, therefore, has been to avoid potential collisions on licensed or otherwise pre-allocated frequency spectra. Thus, cognitive radio systems have been developed to sense legitimate user presence on a given spectrum and avoid utilizing that spectrum in a manner that would cause a collision. When no user presence is detected, the cognitive radio system would utilize the spectrum to a greater degree, or without restraint. This can be accomplished by active monitoring of several factors in the external and internal radio environment, including radio frequency spectrum, user behavior and network state.

One existing problem in spectrum sensing cognitive radio is designing high quality spectrum sensing equipment cost effectively enough for mass production for the handheld electronic communication device market. Another problem is designing algorithms for exchanging spectrum sensing data between nodes. Simple energy detectors may not be sufficiently accurate to guarantee detection of other users in a given spectrum, suggesting a need for more sophisticated spectrum sensing techniques, or for increasing a number of cooperative sensing nodes to decrease false detection rates, and sharing cooperative measurements more effectively. Therefore, a need exists for more sophisticated mechanisms to accurately sense the presence of other users on wireless frequencies, and to apply that sensing toward efficient utilization of those wireless frequencies.

SUMMARY

The following presents a simplified summary to provide a basic understanding of some aspects of the various embodiments. This summary is not an extensive overview of the various embodiments. It is intended to neither identify key or critical elements of the various embodiments nor delineate the scope of such embodiments. Its sole purpose is to present some concepts of the various embodiments in a simplified form as a prelude to the more detailed description that is presented later.

Various aspects of the subject disclosure provide for cooperative sensing in wireless communications that improves user terminal throughput and minimizes interference. According to some aspects, a network entity, such as a base station, radio network controller, or the like, can assign a set of SUTs to measure a subset of wireless channels in a target frequency. In particular aspects, this assignment can be implemented so as to increase or maximize potential traffic throughput of those SUTs within the target frequency. In this manner, cooperative sensing can be structured so as to provide more efficient traffic communications within the target frequency.

In additional aspects of the subject disclosure, cooperative sensing can be constrained to reduce interference to primary user terminals operating within a target frequency. Additional constraints can also be imposed, for instance, to implement synchronized multi-user channel sensing, a positive traffic transmission time, provide a minimum transmission time, or the like, to further improve the cooperative sensing. These constraints can reduce complexity of throughput optimizations associated with cooperative sensing, or further improve traffic throughput, or suitable combinations thereof.

In at least one additional aspect of the subject disclosure, cooperative sensing based on optimized throughput can incorporate reward functions for identifying a desired wireless condition. Scheduling algorithms can select a sensing assignment in a manner that maximizes the reward, to increase a likelihood of discovering the desired wireless condition. In one aspect, the reward algorithm imposes a balance between maximizing expected immediate reward for a current wireless time slot, and maximizing expected future reward for a subsequent wireless time slot(s). This aspect can achieve an optimal performance for cooperative sensing. In another aspect, the reward algorithm prioritizes maximizing immediate reward over future reward to reduce complexity of the scheduling algorithm. In at least one additional aspect, the complexity can be further reduced by subdividing a number of user terminals and wireless channels into respective subgroups, and executing the scheduling algorithm separately for different subgroups, or suitable combinations of subgroups.

The following description and the annexed drawings set forth in detail certain illustrative aspects of the various embodiments. These aspects and their equivalents are indicative, however, of but a few of the various ways in which the principles of the various embodiments may be employed, and such embodiments should thus not be limited to any particular aspect or aspects described herein. Other advantages and distinguishing features of the various embodiments will become apparent from the following detailed description when considered in conjunction with the drawings.

DETAILED DESCRIPTION

Figure 1:
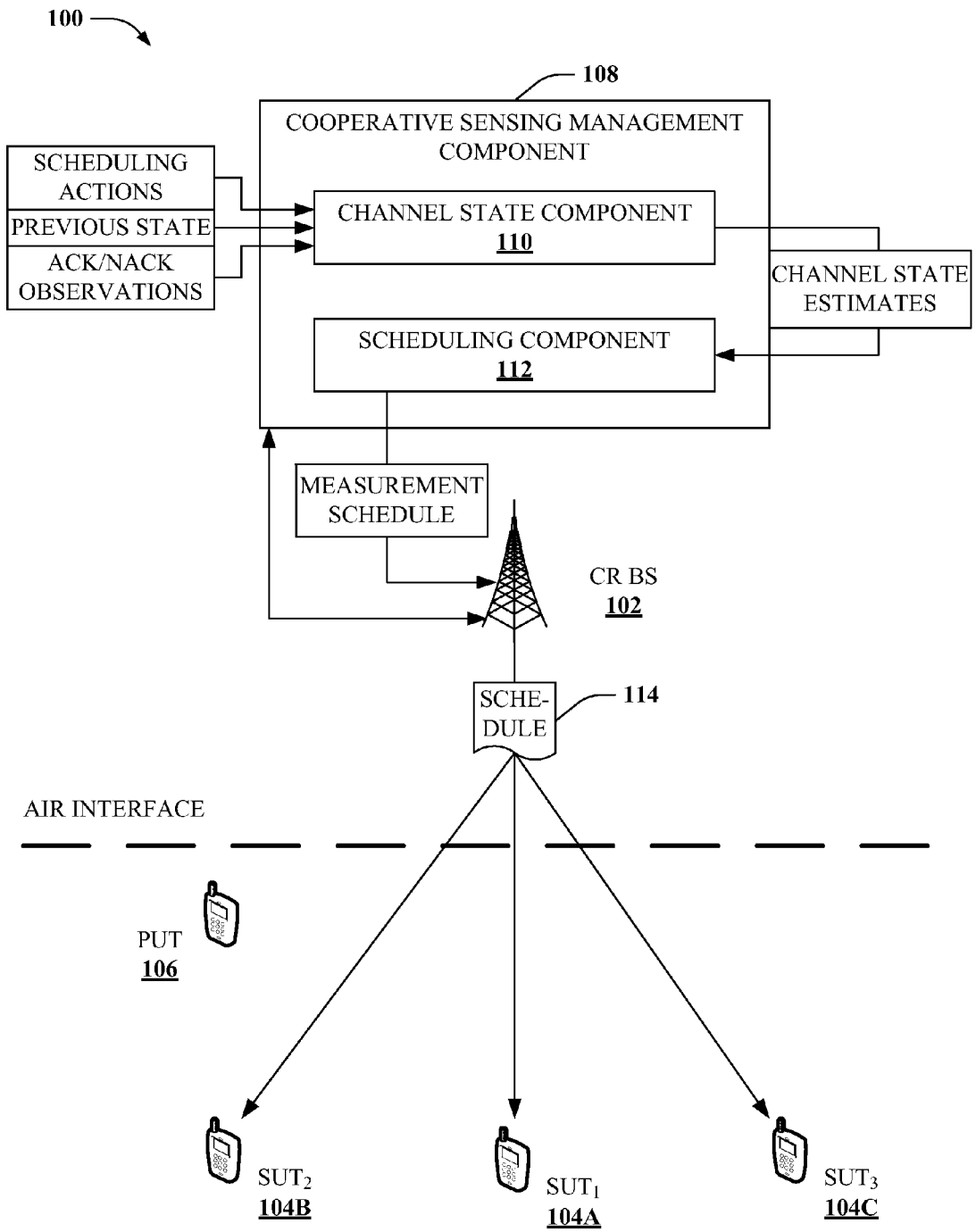
FIG. 1 illustrates a block diagram of an example wireless communication environment suitable for cognitive radio according to aspects of the subject disclosure.

The various embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments may be practiced without these specific details. In other instances, well-known structures and devices are shown in block diagram form in order to facilitate describing the various embodiments.

As used in this application, the terms "component," "module," "system", or the like can refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the various embodiments may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the various embodiments.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In cognitive radio (CR) there are typically two types of user equipment, primary user equipment (which includes primary user terminals) and secondary user terminals (SUTs). Primary user equipment is generally some kind of wireless interface device (e.g., wireless transmitter, wireless receiver, wireless transceiver) that is licensed for a particular frequency spectrum, or employs a service allocated to the particular frequency spectrum. A SUT, on the other hand, is typically not licensed on the particular frequency, or utilizes a different service than what the frequency spectrum is allocated for. As an example, a cellular phone is a SUT on a frequency spectrum allocated for broadcast television, as the cellular phone utilizes a different service (e.g., cellular wireless communications as opposed to reception of broadcast television) than what this frequency spectrum is allocated for. As yet another example, the cellular phone is a secondary user on a frequency spectrum allocated for 802.11 wireless communications, as the cellular phone is not licensed to utilize the frequency spectrum allocated for 802.11 wireless communications, and so on.

Cognitive radio employs a channel sensing mechanism to avoid causing interference to primary user equipment on frequencies employed by the primary user. By sensing a channel, an estimate of whether transmissions are occurring on that channel at a given point in time can be made. Channels estimated to be idle, having no transmissions, are employed for traffic transmissions of SUTs. Channels estimated to be busy are avoided by SUTs.

One problem with the channel sensing mechanism occurs when sensing estimates are incorrect. This can happen, for instance, when a SUT fails to sense existing transmissions on a frequency and the frequency is improperly identified as idle, when it is in fact busy. This condition is referred to herein as a misdetection. Another incorrect sensing estimate can occur when the SUT senses a transmission on the frequency, when no such transmission in fact exists. This occurrence is referred to herein as a false alarm.

To improve sensing accuracy, multiple SUTs can be employed to sense a particular frequency, in a cooperative sensing arrangement. Although cooperative sensing can improve spectrum sensing accuracy, it also has some drawbacks, especially when a number of secondary users available for the cooperative sensing is limited, and the sensing equipment employed by the SUTs is limited to sequential (e.g., narrowband) sensing. In this case, several SUTs can be scheduled to sense several channels sequentially, decreasing an amount of time available for those SUTs to transmit or receive traffic in a given wireless time frame. Thus, there is a tradeoff between cooperative sensing time and traffic transmissions (whether uplink or downlink) in the wireless time frame.

To complicate the foregoing problem, the idle spectrum available for SUTs to access is time varying, and the information about the changing idle spectrum can only be partially observed by SUTs. This is due to existence of imperfect spectrum sensing equipment and sensing scheduling policy. To address this problem, various aspects of the subject disclosure provide a dynamic scheduling policy for cooperative sensing that is configured for a time-varying spectrum environment. According to particular aspects, the dynamic scheduling is derived from a partially observable Markov decision process (POMDP) that is employed to improve or optimize data throughput for the SUTs on the idle spectrum. The dynamic scheduling policy is employed to select a subset of the SUTs to measure a subset of wireless channels on a target frequency. In addition, the dynamic scheduling policy can select a target misdetection probability, or a target false detection probability, or some suitable combination thereof. Moreover, various reward functions can be implemented in a tradeoff between computational complexity and estimation accuracy. In additional aspects, a pruning algorithm can be employed to further reduce computational complexity, or the scheduling policy can be applied to subgroups of SUTs or subgroups of wireless channels to reduce complexity as well.

Referring now to the drawings, FIG. 1 illustrates a block diagram of an example wireless communication environment 100 suitable for CR applications, according to aspects of the subject disclosure. Wireless communication environment 100 can comprise a CR base station 102, serving a plurality of SUTs, including $SUT_1$ 104A, $SUT_2$ 104B, $SUT_3$ 104C, . . . , (referred to collectively as SUTs 104A-104C). In addition, at least one primary user equipment 106 exists within a signal range of CR base station 102. The primary user equipment can include a cellular telephone that operates in conjunction with a non-cognitive cellular communication system, or another suitable wireless communication device, such as an 802.11(a, b, g, n, etc.) wireless device, an electronic paging service, an amateur radio transmitter, a broadcast television transmitter, an AM or FM radio transmitter, and so forth. Based on cognitive radio principles, SUTs can be configured to sense various frequency spectra within a geographic region served by CR base station 102, including those frequency spectra on which primary user equipment 106 is licensed, or is utilizing an allocated service.

SUTs 104A-104C can be defined mathematically as a set of SUTs M={1, 2, . . . , M}, and wireless channels within the geographic region covered by CR base station 102 can be defined as a set of orthogonal wireless channels N={1, 2, . . . , N}. According to particular aspects of the subject disclosure, SUTs 104A-104C can employ a single radio interface, although it should be understood that the subject disclosure is not limited to this example implementation.

CR base station 102 and SUTs 104A-104C operate in a time-slotted manner having a fixed wireless time slot length of T (which also can be referred to as a wireless time frame, or other suitable terminology). Respective wireless channels of the set of wireless channels have two discrete states, an idle state (in which no transmissions related to primary user equipment 106 occur) and a busy state (in which transmissions related to primary user equipment 106 do occur). In one aspect of the subject disclosure, the states of respective channels can be modeled with a two-state discrete time Markov chain (DTMC). The two states are represented as state 0 and state 1 in this model, and there are four transition probabilities from one wireless time slot to another. Specifically, a wireless channel can be in state 0 and transition to state 1, be in state 0 and remain in state 0, be in state 1 and transition to state 0, or be in state 1 and remain in state 1, from one wireless time slot to the other. Said differently, $s_n(t)$ can represent an availability state of a channel n (n∈N) in time slot t, such that $s_n(t)=0$ denotes channel n is idle (available for traffic transmissions associated with SUTs 104A-104C) whereas $s_n(t)=1$ denotes channel n is busy (unavailable for use by SUTs 104A-104C) in time slot t. In addition, the following vector s(t), defined as $s(t)=(s_1(t), \ldots, s_N(t))$ has dimensions 1×N and denotes the channel availability of each of the N wireless channels in time slot t. This channel availability vector is defined as having the following state space: $\Omega^s=\{(\omega_1, \omega_2, \ldots, \omega_N) \| \omega_n=\{0,1\}, \forall n \in N\}$. By assuming the various wireless channels transition between idle and busy states independently, the dynamics of s(t) follow a DTMC with a transition probability from state vector ω to state vector ω' being given by equation (1):

$$P_{\omega\omega'} = Ps(t+1)r = \omega' | (s(t) = \omega) = \prod_{n=1}^{N} P_{\omega_n \omega'_n}, \quad (1)$$

$$\forall \omega, \omega' \in C^S$$

where $\omega_n$ and $\omega'_n$ represent the nth element of state vector ω and ω', respectively.

State transition probabilities for wireless channel n can be expressed as $P_{\omega_n \omega'_n}^n$. In at least one aspect of the subject disclosure, transition probabilities can be assumed to be time homogeneous, e.g., where $P_{01}^n$, $P_{10}^n$, $\forall n \in N$, are time independent. Further, stationary probabilities of being idle and busy can be defined as $\pi_0^n$, $\pi_1^n$, $\forall n \in N$, and can be calculated with the following equations:

$$\pi_0^n = \frac{P_{10}^n}{P_{01}^n + P_{10}^n}; \; \pi_1^n = \frac{P_{01}^n}{P_{01}^n + P_{10}^n}.$$

In another aspect of the subject disclosure, CR base station 102 can calculate, or can obtain from another entity, measurements of long term statistical behavior of the respective wireless channels. This long term statistical behavior can then be utilized to derive initial transition probability states of the wireless channels.

CR base station 102 comprises, or is communicatively connected with, a cooperative sensing management component (CSMC) 108. CSMC 108 is configured to schedule SUTs 104A-104C to sense wireless channels, to facilitate estimation of whether those wireless channels are idle or busy. Where such measurements are correct, traffic transmissions can be scheduled on idle state channels without fear of interference with primary user equipment 106 employing those channels. However, because measurements of the wireless channels can result in misdetection or false alarms, lack of interference is not guaranteed, particularly when the idle/busy state of a wireless channel can change with time. To refine scheduling estimates over time, CSMC 108 can comprise a channel state component 110 that is configured to estimate respective idle or busy states of wireless channels for a current wireless time slot. This estimation of current state can be based on prior state information, as well as scheduling actions, and collision observations, e.g., acknowledgment (ACK) or negative acknowledgment (NACK) feedback provided by SUTs 104A-104C, as described in more detail below. Based on this information, a current state estimate of the N wireless channels is provided to a scheduling component 112, which makes cooperative sensing decisions for SUTs 104A-104C in a subsequent wireless time slot (e.g., see FIG. 2, infra for an example time-based cooperative scheduling process).

Spectrum measurements performed by SUTs 104A-104C of the wireless channels have a received signal expressed as $x_R(t)$. Signal energy of the received signal can be expressed as follows:

$$x_R(t) = \begin{cases} e(t) & H_0(t) \\ 1h \cdot x_T(t) + e(t) & H_1(t) \end{cases}$$

where $x_R(t)$ is the signal received at one of SUTs 104A-104C, $x_T(t)$ is the signal transmitted by primary user equipment 106 (or some other entity operating on one of the measured wireless channels), e(t) is additive Gaussian noise, h is channel gain of the sensing channel between primary user equipment 106 and the particular SUT 104A-104C receiving the signal. For the above expression of received signal energy $x_R(t)$, a first hypothesis $H_0$ corresponds with no transmission of a signal by primary user equipment 106 ($x_T(t)=0$), whereas a second hypothesis, $H_1$ corresponds with actual signal transmission ($x_T(t) \neq 0$). In a non-fading wireless environment, the probability of properly detecting a signal is given by equation (2), and the probability of a false alarm is given by equation (3):

$$P_D = Pr(Y > \lambda \mid H_1) = Q_u(\sqrt{2\gamma}, \sqrt{\lambda}) \quad (2)$$

and $$P_{FA} = Pr(Y > \lambda \mid H_0) = \frac{\Gamma\left(u, \frac{\lambda}{2}\right)}{\Gamma(u)} \quad (3)$$

where Y is a test or decision statistic, $\lambda$ is a decision threshold, u is the product of time and bandwidth of the spectrum being sensed, and $\gamma$ is the signal to noise ratio (SNR). In addition, $Q_u(\bullet, \bullet)$ is the generalized Marcum Q-function, and $\Gamma(\bullet)$ and $\Gamma(\bullet, \bullet)$ are the complete and incomplete gamma functions, respectively. Given equation (2), the misdetection probability is defined as $P_{MD} = 1 - P_D$.

According to specific aspects of the subject disclosure, channel state component 110 can employ a cooperative sensing scheme based on the "or" rule. Based on this "or" rule, each SUT 104A-104C submits its sensing result (e.g., either a 0 or 1) for a particular wireless channel to CR base station 102, and if any SUT 104A-104C senses this wireless channel as busy, channel state component 110 sets the idle/busy state of the wireless channel to busy. If every SUT 104A-104C sensing the channel reports the wireless channel as idle, channel state component 110 sets the idle/busy state of the wireless channel to idle. Based on the "or" rule, the misdetection and false alarm probabilities of channel n can be expressed as follows:

$$P_{MD}(n) = \prod_{m \in M(n)} P_M(m, n)$$

$$P_{FA}(n) = 1 - \prod_{m \in M(n)} (1 - P_F(m, n))$$

where $P_{MD}(m,n)$ and $P_{FA}(m,n)$ are the misdetection and false alarm probabilities of SUT m when measuring wireless channel n. Further, M(n) is the subset of SUTs 104A-104C assigned by scheduling component 112 to sense wireless channel n.

According to at least one additional aspect of the subject disclosure, scheduling component 112 can assign a misdetection probability or a false alarm probability to one or more of SUTs 104A-104C when detecting one or more of the wireless channels. The misdetection probability and false alarm probability can be transmitted along with a measurement schedule 114 (e.g., identifying which SUTs sense which wireless channels) and can be utilized, for instance, to tune the sensing equipment of the respective SUT 104A-104C at a particular level. These probabilities can also be employed to constrain the sensing to a predetermined probability of interference to primary user equipment 106, as is described in more detail below. In the case where each SUT assigned to sense channel n employs the same misdetection probability and false alarm probability, the misdetection probability for each SUT can be expressed as:

$$P_{MD}(m,n) = |M(n)| \sqrt{P_{MD}(n)}$$

where |M(n)| denotes cardinality of the subset M(n) of SUTs 104A 104C. According to one particular aspect of the subject disclosure, $P_{MD}(n)$ can be set to a constant target value for multiple SUTs sensing a particular channel, in which case a tolerable misdetection probability $P_{MD}(m,n)$ for each of the |M(n)| SUTs increases to $|M(n)|\sqrt{P_{MD}(n)}$. The larger the misdetection probability, the larger the corresponding decision threshold λ. As the decision threshold λ becomes larger, the false alarm probability $P_{FA}(m,n)$ becomes smaller (e.g., see equation (3), supra). Said differently, if the misdetection probability is set to a constant target value, false detection probability improves as a number of SUTs 104A-104C cooperatively sensing a particular wireless channel increases. Thus, according to this particular aspect, improved sensing results are achieved when scheduling component 112 increases the number of SUTs 104A-104C assigned to sense a given channel. However, the more channels a given SUT 104A-104C senses, the longer the overall sensing duration, and the less time is available for traffic transmissions for the SUTs 104A-104C. Accordingly, in still other disclosed aspects discussed in more detail below, scheduling component 112 seeks a balance between false alarm detection and transmission time by employing a reward function that optimizes throughput with a target collision probability constraint.

aspects discussed in more detail below, scheduling component 112 seeks a balance between false alarm detection and transmission time by employing a reward function that optimizes throughput with a target collision probability constraint.

Figure 2:
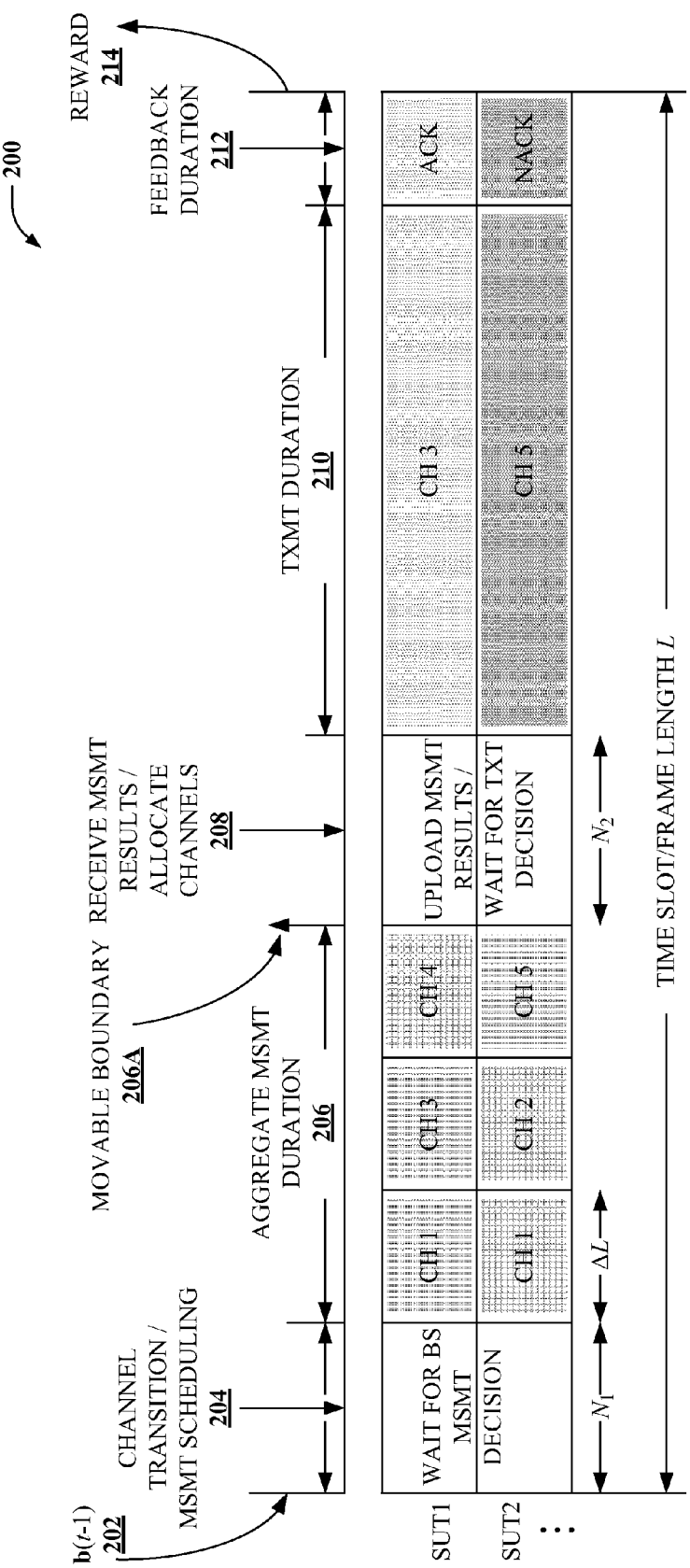
FIG. 2 depicts a block diagram of a sample cooperative sensing management component according to further disclosed aspects.

FIG. 2 illustrates an example wireless time slot 200 (or wireless time slot) that can be employed for CR communications in aspects of the subject disclosure. Wireless time slot 200 is a current or existing time slot at time t such that a previous time slot (not depicted) is t−1, and a subsequent time slot is t+1. Additionally, wireless time slot 200 can have an overall duration of L.

Respective blocks of wireless time slot 200 specify actions taken by a set of SUTs, including $SUT_1$, $SUT_2$, . . . , and so on. At the beginning of time slot 200, wireless channels have a state transition according to a DTMC model described supra (e.g., see equation (1)). A belief vector b(t−1) is calculated for target wireless channels to model this state transition, and is employed for assigning a subset of the SUTs to measure at least a subset of the wireless channels in a cooperative sensing arrangement. As depicted, calculation of the belief vector b(t−1) occurs at 202 and scheduling the cooperative sensing can occur at 204. During this period 204, which has a duration of $N_1$, SUTs wait for and receive the scheduling assignment.

Once the scheduling assignment is received, the SUTs begin sensing assigned wireless channels. The scheduling assignment can also include the misdetection probability or false alarm probability utilized by the SUTs for setting their respective sensing equipment. In one aspect, different misdetection or false alarm probabilities can be assigned to different SUTs, or for different wireless channels, or combinations thereof. In at least one aspect, however, a common misdetection probability or a common false alarm probability is assigned to all SUTs, or to all wireless channels, or a suitable combination thereof.

In at least one aspect of the subject disclosure, duration of a single measurement can be ΔL, as depicted. The duration is ended with a movable boundary 206A, which depends on the number of channels being sensed. In the example provided by wireless time slot 200, $SUT_1$ senses wireless $channel_1$, wireless $channel_3$ and wireless $channel_4$. $SUT_2$ also senses wireless $channel_1$, and then senses wireless $channel_2$ and wireless $channel_5$. An aggregated duration of these measurements is indicated at 206, where the sensing duration per channel is fixed at ΔL. If the CR base station selects multiple SUTs to measure a single channel (e.g., to increase sensing accuracy for that channel), less time might be available for traffic transmissions, potentially lowering traffic throughput for the wireless time slot. This illustrates the tradeoff between cooperative sensing time and traffic transmission time.

As is depicted, $SUT_1$ measures $channel_1$ to be idle, measures $channel_3$ to be idle, and measures $channel_4$ as busy. $SUT_2$ measures $channel_1$ and $channel_2$ both to be busy, and $channel_5$ as idle. After finishing the measurements at 206, SUTs upload measurement results to the CR base station. Based on the "or" sensing rule, the base station establishes $channel_1$ as busy, since at least one of the SUTs measured $channel_1$ as busy. Likewise, $channel_2$ and $channel_4$ are established as busy, and $channel_3$ and $channel_5$ are established as idle.

According to one or more particular aspects of the subject disclosure, allocation of traffic transmissions can be handled as follows. If a channel measurement result indicates the channel is idle, then although there exists a probability of a misdetection on the channel, the CR base station can utilize this channel for assigning traffic transmissions. Based on these results, the CR base station allocates $channel_3$ and $channel_5$ for traffic transmissions for $SUT_1$ and $SUT_2$, respectively.

Sending or receiving traffic transmissions occur during transmit duration 210. As is depicted, $SUT_1$ successfully transmits on $channel_3$, and sends an ACK at feedback duration 212. On the other hand, $SUT_2$ experiences interference on $channel_5$, which turns out to be busy despite being sensed as idle (a misdetection). Thus, $SUT_2$ sends a NACK in the feedback duration 212. Alternatively, $SUT_2$ can simply refrain from sending an ACK if interference is experienced on $channel_5$. Failure to receive an ACK within feedback duration 212 can be interpreted as the equivalent of receiving a NACK. This enables NACK functionality to be inferred even where $channel_5$ is in fact busy, and an actual NACK signal cannot be sent on $channel_5$. Based on the ACK/NACK feedback, CR base station now knows that $channel_3$ was indeed idle during wireless time slot t, whereas $channel_5$ was indeed busy during wireless time slot t. The ACK/NACK feedback can be employed to build an observation vector for each of the wireless channels, based on deterministic results for channels which ACK/NACK feedback is obtained, and state probabilities for channels sensed as busy (and therefore no traffic transmissions and ACK/NACK feedback available) or channels that are not sensed. Once the observation vector is built, CR base station can update a belief vector that represents probability states for the wireless channels, where the belief vector can be generated on a prior state of the belief vector in time t−1, as well as the sensing actions in time t (e.g., $SUT_1$ having measured $channels_{1, 3, 4}$ and $SUT_2$ having measured $channels_{1, 2, 5}$), and the observation vector obtained in time t. Both the observation vector and belief vector are discussed in more detail below.

Figure 3:
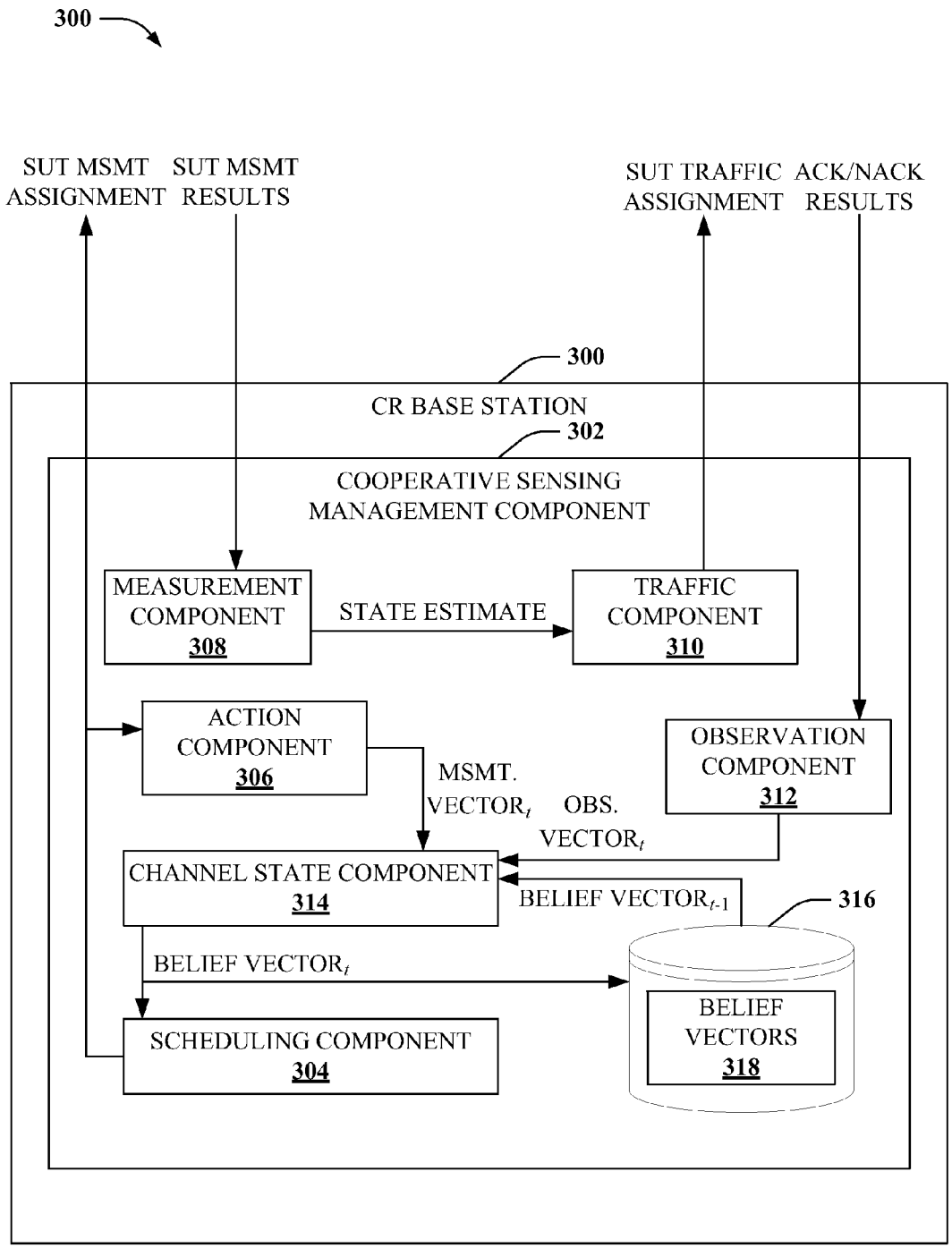
FIG. 3 illustrates a block diagram of an example storage database for storing behavior data of wireless channels to estimate future states of such channels.

FIG. 3 illustrates a block diagram of a sample CR base station 300 according to particular aspects of the subject disclosure. CR base station 300 comprises a CSMC 302 that provides cooperative SUT sensing on primary user wireless channels. Moreover, the cooperative sensing can employ a scheduling algorithm that improves traffic throughput for a set of SUTs on the primary user wireless channels. Thus, CSMC 302 provides a significant improvement over prior CR implementations that do not address the throughput problem involved in cooperating sensing.

CSMC 302 can comprise a scheduling component 304 that selects a subset of SUTs (not depicted) to perform idle/busy state measurements on a subset of the primary user wireless channels. As mentioned above, this selection can conform to a data traffic throughput constraint for the SUTs configured to optimize the data traffic throughput at least in a given wireless time slot. The scheduling algorithm employed by scheduling component 304 is discussed in more detail below.

CSMC 302 can further comprise an action component 306 that generates a measurement vector in respective wireless time slots. This measurement vector is derived from channel measurement selections output by scheduling component 304. Further, the measurement vector can be provided to a channel state component 314 to facilitate estimation of idle/busy states of the primary user wireless channels, which in turn can be employed by scheduling component 304 for optimizing traffic throughput in regard to subsequent SUT channel measurements.

According to particular aspects of the subject disclosure, the measurement vector (also referred to as an action vector) generated by action component 306 can comprise two actions, $\alpha^I$ and $\alpha^{II}$. $\alpha^I$ is compiled from cooperative sensing decisions performed by scheduling component 304 that determine which SUT senses which primary user channel. In addition, $\alpha^{II}$ establishes a misdetection probability or false alarm probability for SUTs to tune their respective sensor operating points when sensing assigned channels. The $\alpha^I$ action can be defined as follows:

$$a^I(t) = \begin{bmatrix} a^1_{11}(t) & \ldots & a^1_{1N}(t) \\ a^1_{21}(t) & \ldots & a^1_{2N}(t) \\ \ldots & \ldots & \ldots \\ a^1_{M1}(t) & \ldots & a^1_{MN}(t) \end{bmatrix}$$

where $\alpha_{mn}^1(t) \in \{0,1\}$, $\alpha_{mn}^1(t)=1$ denotes that SUT m senses primary user channel n in time slot t, and $\alpha_{mn}^1(t)=0$ denotes that SUT m does not sense primary user channel n in time slot t. The set of SUTs scheduled to sense channel n in time slot t can be defined as $M(n,t)=\{m|\alpha_{mn}^1(t)=1\}$. Additionally, action $\alpha^{II}$ can be defined as follows:

$$a^{II}(t) = \begin{bmatrix} a^2_{11}(t) & \ldots & a^2_{1N}(t) \\ a^2_{21}(t) & \ldots & a^2_{2N}(t) \\ \ldots & \ldots & \ldots \\ a^2_{M1}(t) & \ldots & a^2_{MN}(t) \end{bmatrix},$$

where $\alpha_{mn}^2(t)=P_{MD}(m,n,t)$ indicates a specified misdetection probability for SUT m when sensing primary user channel n in time slot t. It is worth noting that by setting the value of the misdetection probability $P_{MD}(m,n,t)$, the sensor operating point for SUT m on channel n in time slot t is determined as well, since both the sensing decision threshold $\lambda$ and the false alarm probability $P_{FA}(m,n,t)$ can be calculated via equation (2) and equation (3), respectively. According to at least one disclosed aspect, the value of the misdetection probability $P_{MD}(m,n,t)$ is selected from a set of discrete values that are practical for typical spectrum sensing modules employed by the set of SUTs. To define both actions of the measurement vector in a single function, the term $\alpha(t)$ can be defined as $a(t)=[\alpha^I(t),\alpha^{II}(t)]$. According to the foregoing aspects then, action component 306 can be configured to calculate $a(t)$ from scheduling selections and misdetection values established by scheduling module 304 in a given wireless time frame t.

Scheduling decisions established by scheduling component 304 are transmitted to the set of SUTs communicatively coupled with CR base station 300, as described above at FIG. 2, supra. In response, the set of SUTs upload a set of measurement results after sensing the assigned primary user channels. A measurement component 308 receives and records the channel measurements performed by the SUTs, and identifies one or more of the primary user wireless channels that are likely to be in an idle state, according to the channel measurements, or one or more such wireless channels likely to be in a busy state according to the channel measurements. Channels identified as being in an idle state according to the channel measurements are provided to a traffic component 310.

Traffic component 310 schedules uplink or downlink traffic transmissions for at least one of the set of SUTs to one or more of the primary user wireless channels identified by measurement component 308 as being in an idle state. The traffic scheduling is forwarded to the SUTs, which can respond with ACK/NACK results of those traffic transmissions. These ACK/NACK results are received and analyzed by an observation component 312.

According to one example implementation, observation component 312 denotes as $\theta_n(t)$ the observation result of primary user wireless channel n in time slot t. According to this implementation, $\theta_n(t)$ can have the following possible observations: where measurement component 308 identifies channel n as idle and observation component 312 receives an ACK in response to transmissions on this channel, $\theta_n(t)=0$. Where measurement component 308 identifies channel n as idle and observation component 312 receives a NACK in response to transmissions on this channel, $\theta_n(t)=1$. Additionally, where measurement component 308 identifies channel n as busy and no traffic transmissions are scheduled on this channel, $\theta_n(t)=2$. Further, where scheduling component 304 does not select an SUT to sense channel n, and thus no ACK/NACK feedback is obtained by observation component 312, $\theta_n(t)=3$.

Observation component 312 can then establish $\theta(t)$, the $1 \times N$ vector $\theta(t)=(\theta_1(t), \ldots \theta_N(t))$, as an observation vector for the primary user wireless channels at the end of time slot t. This observation vector has the observation space: channel n and any ACK/NACK feedback), and the current state of channel n. This observation probability can be expressed as follows:

$$P$$

$$r(\theta_n((t) \mid a(t)s_n(t)) = \begin{cases} 1, & \text{if } \sum_{m=1}^{M} a_m^1(t_n) > 0, \theta_n(t) = 3 \\ 1 - P_{FA}(n, t), & \text{if } \sum_{m=1}^{M} a_m^1(t)_n > 0, s_n(t) = 0, \theta_n(t) = 0 \\ P_{FA}(n, t), & \text{if } \sum_{m=1}^{M} a_m^1(t)_n > 0, s_n(t) = 0, \theta_n(t) = 2 \\ P_{MD}(n, t), & \text{if } \sum_{m=1}^{M} a_m^1(t)_n > 0, s_n(t) = 1, \theta_n(t) = 1 \\ 1 - P_{MD}(n, t), & \text{if } \sum_{m=1}^{M} a_m^1(t)_n > 0, s_n(t) = 1, \theta_n(t) = 2 \\ 0, & \text{otherwise} \end{cases}$$

where $P_{MD}(n,t)$ is the misdetection probability of channel n in time slot t, and $P_{FA}(n,t)$ is the false alarm probability of channel n in time slot t. Based on the "or" rule for cooperative sensing discussed supra:

$$P_{MD}(n, t) = \prod_{m \in M(n,t)} P_{MD}(m, n, t)$$

$$P_{FA}(n, t) = 1 - \prod_{m \in M(n,t)} (1 - P_{FA}(m, n, t))$$

For the above observation probability function, if $$\sum_{m=1}^{M} a_{mn}^1(t) = 0,$$

meaning no SUT is assigned to sense channel n, then observation 3 occurs with probability 1 regardless of the current idle/busy state of channel n. If, however, $$\sum_{m=1}^{M} a_m^1(t_n) > 0, s_n(t) = 0,$$

meaning at least one SUT senses channel n and measures the channel to be idle, observation 0 occurs if no false alarm exists; otherwise observation 2 occurs when a false alarm does occur. If instead $$\sum_{m=1}^{M} a_m^1(t_n) > 0, s_n(t) = 1,$$

meaning at least one SUT senses channel n and measures the channel to be in a busy state, observation 2 results if no misdetection occurs; otherwise observation 1 results when no misdetection occurs. The observation probability can therefore be expressed as:

$$Pr(\theta(t) = zr \mid a(t)s(t) = \omega) = \prod_{n=1}^{N} P(\theta_n(t) = z_n \mid a(t), s_n(t), = \omega_n)$$

where $z \in Z^\theta$ is the observation vector, and $z_n$ denotes the nth element of observation vector z. According to at least one additional aspect of the subject disclosure, each SUT scheduled to sense channel n can tune to the same sensor operating point. In this case the following equality holds true:

$$b(t) \triangleq \{b_\omega(t)\}_{\omega \in \Omega^s}$$

Once the observation vector is established by observation component 312, the observation vector for time slot t is forwarded to channel state component 314. Additionally, the measurement vector for time slot t is forwarded by action component 306 to channel state component 314. Channel state component 314 can also obtain a belief vector for time slot t−1 from memory 316, which stores prior belief vectors 318. Utilizing the measurement vector$_t$, observation vector$_t$, and belief vector$_{t-1}$, channel state component 314 can calculate a belief vector for time slot t, which comprises determined or estimated idle/busy state probabilities for the primary user channels at the end of time slot t. This new belief vector can be utilized by scheduling component 304 at the start of time slot t+1 to schedule cooperative sensing in time slot t+1 in a manner that optimizes traffic throughput, as described below.

Because of partial spectrum sensing decisions and the presence of sensing errors, channel state component may not observe the true idle/busy state of the primary user channels. However, these states can be inferred based on prior decisions and observations and compiled into the belief vector $$b(t) \triangleq \{b_\omega(t)\}_{\omega \in \Omega^s}$$

(although the elements of belief vector b(t) need not be in a particular order), where $$b_\omega(t) \triangleq Ps(t)r = \omega(|b(0)\{a(\tau)\theta(\tau)\}_{\tau=1}^t) \in [0, 1]$$

is the conditional probability (given all past decisions and observations) that the idle/busy state of the primary user wireless channels is ω in the current time slot t. In this case, $b_\omega(t)$ is computed by channel state component 314 at the end of the current time slot t when θ(t) is known and provided by observation component 312 (e.g., see the timing process of FIG. 2, supra). Scheduling component 302 can then make cooperative scheduling decisions at time slot t+1 based on this belief vector of the channel state b(t).

Based on the foregoing, the updated belief vector can be defined as follows:

$$b(t) \triangleq T(b(t-1)a, (t)\theta, (t) \triangleq \{b_{\omega'}(t)\}_{\omega' \in \Omega^s}. \quad (5)$$

where T(b(t−1),α(t),θ(t)) represents the updated knowledge of the primary user wireless channel state after incorporating the measurement vector and observation vector obtained in time slot t (note that T(b(t−1),α(t),θ(t)) should not be confused with the maximum time slot T appearing in equation (10) and thereafter). From Bayes rule, the following equation can be derived:

$$b_{\omega'}(t) = Ps(t)r = \omega(' \mid b(t-1)a(t,)\theta(t,)) \quad (6)$$

$$= \frac{\sum_{\omega \in \Omega^s} b_\omega(t-1) P_{\omega\omega'} P\theta(t) \mid a((t)s(, t) = \omega')}{\sum_{\omega \in \Omega^s} \sum_{\omega'' \in \Omega^s} b_\omega(t-1) P_{\omega\omega''} P\theta(t) \mid a((t)s(, t) = \omega'')}$$

It is worth nothing that from equations (5) and (6), the Markov property for the belief state is obtained in that the subsequent belief state depends only on the previous belief state, the current action and the current observation received.

To illustrate application of the belief vector, the following updating rule can be derived with respect to channel n, based on equation (6). First, if the action of sensing channel n is taken, the observation vector state can be 0, 1, or 2. In the case of observation vector state 0, an ACK is received following traffic transmissions scheduled on channel n, and thus channel n is known to be in an idle state at time slot t, and according to equation (6), $b_0(t)=1$. In the case of observation vector state 1, a NACK is received following the traffic transmissions, and thus channel n is known to be in a busy state for time slot t. Thus, according to equation (6), $b_0(t)=0$. Where the observation vector is in state 2, however, the channel state is only partially observable because no traffic transmissions are scheduled, and thus although measurement(s) of channel n indicate that the channel is busy, these measurements are subject to a false alarm. According to equation (6) then:

$$b_0(t) = \{b_0(t-1) \cdot P_{00}{}^n \cdot P_{FA}(n,t) + b_1(t-1) \cdot P_{10}{}^n \cdot P_{FA}(n,t)\} / \{b_0(t-1) \cdot P_{00}{}^n \cdot P_{FA}(n,t) + b_1(t-1) \cdot P_{10}{}^n \cdot P_{FA}(n,t) + b_0(t-1) \cdot P_{01}{}^n \cdot (1 - P_{MD}(n,t)) + b_1(t-1) \cdot P_{11}{}^n \cdot (1 - P_{MD}(n,t))\}.$$

If the false alarm probability becomes 0, then $b_0(t)$ becomes 0 as well. Where the observation vector is in state 3 because channel n was not measured by any SUT in time slot t, the exact channel state is not known. In this case, the belief state of channel n updates according to the DTMC model, and according to equation (6):

$b_0(t) = b_0(t-1) \cdot P_{00}{}^n + b_1(t-1) \cdot P_{10}{}^n$. As utilized herein, $b_0(t)$ is the belief that a channel is in an idle state in time slot t, whereas the belief that the channel is in a busy state is $b_1(t) = 1 - b_0(t)$.

Once the belief vector for time slot t is calculated by channel state component 314 (per the above), scheduling component 304 can employ this belief vector for scheduling cooperative sensing in time slot t+1. Moreover, the scheduling can be implemented in a manner that optimizes traffic throughput for the SUTs in time slot t+1. To accomplish the traffic optimization, a reward function is employed by scheduling component 304 that weights scheduling possibilities $\alpha^I$ or sensor operating points $\alpha^{II}$ toward those possibilities that increase traffic throughput. In some aspects of the subject disclosure, the reward function establishes a reward when an idle state measurement is verified by observation. According to particular aspects, the reward function can be implemented to balance expected immediate reward in a current time slot, with expected future reward in subsequent time slots. In another aspect, the reward function can be implemented to prioritize expected immediate reward over future reward to reduce calculation complexity. In yet another aspect, the reward function can be calculated for subsets of SUTs or subsets of primary user wireless channels, to reduce complexity of scheduling calculations.

In at least one aspect of the subject disclosure, if CSMC 302 senses a channel n as idle and receives an ACK in response to traffic transmissions on that channel, the immediate reward for channel n, where (n∈N) can be as follows:

$$R_n(a(t), \theta_n(t)) = \begin{cases} \dfrac{L-k-\eta}{L} & \text{if } \sum_{m=1}^{M} a_m^1(t_n) > 0, \theta_n(t) = 0 \\ 0, & \text{otherwise} \end{cases} \quad (7)$$

where $$k = \Delta L \cdot \sum_{n=1}^{N} a_m^1(t)_n, \forall, m \in M,$$

is the sensing duration for all wireless channels measured by an SUT in a wireless time slot, $\Delta L$ is the sensing duration of an individual primary user wireless channel, and $\eta = \eta_1 + \eta_2$ (in FIG. 2, $N_1 = \eta_1$ and $N_2 = \eta_2$) is a constant period of time used for scheduling decisions and for receiving channel measurement results from the set of SUTs. In a particular aspect of the subject disclosure, each SUT of the set of SUTs is assigned to sense an identical number of primary user wireless channels in a given wireless time slot. This provides synchronization of the sensing duration for the set of SUTs. In this case, $$\sum_{n=1}^{N} a_{1n}^1(t) = \sum_{n=1}^{N} a_{2n}^1(t) = \ldots = \sum_{n=1}^{N} a_m^1(t).$$

Based on the foregoing equation (7) the immediate reward for all primary user wireless channels in time slot t is:

$$R(a(t)\theta(,t)) = \sum_{n=1}^{N} R_n(a(t)\theta_n(t)) \quad (8)$$

According to further disclosed aspects, scheduling component 302 can employ an expected reward to calculate scheduling decisions in a manner that optimizes traffic throughput at the beginning of time slot t, where the expected reward is given by the following:

$$\tilde{R}(a(t)s(t-1), =\omega) = \quad (9)$$
$$\sum_{\omega' \in \Omega^s} \sum_{z \in Z^\theta} P_{\omega\omega'} P\theta(t) = z \mid a(t)s(t) = (\omega')R(a(t)\theta(t) =, z)$$

In one particular aspect of the subject disclosure, an optimal policy is provided that can maximize the expected total throughput of the SUTs over a finite time horizon T, while satisfying a cooperative sensing synchronization constraint (e.g., requiring each SUT engaged in channel sensing to measure an identical number of such channels, to spend an identical amount of time k measuring all of those channels, to spend an identical amount of time $\Delta L$ measuring individual channels, or the like, or a suitable combination thereof), or while satisfying a primary user interference constraint, or a combination thereof. Thus, in this particular aspect, a scheduling algorithm employed by scheduling component 304 for assigning a subset of the SUTs to sense a subset of the primary user wireless channels can comprise the following:

$$\max E\left\{\sum_{t=1}^{T} R(a(t)\theta, (t) \mid b)(0) = b\right\} \quad (10)$$

$$\text{subject to: } \sum_{n=1}^{N} a_{1n}^1(t) = \sum_{n=1}^{n} a_{2n}^1(t) = \ldots = \sum_{n=1}^{N} a_M^1(t) \quad (11)$$

$$T - \Delta T \cdot \sum_{n=1}^{N} a_m^1(t)_n \eta > 0, \forall m \in M \quad (12)$$

$$P_c(n, t) \leq \zeta, \forall n \in N \quad (13)$$

In the above formulation, b is the initial belief vector, which can be obtained from data pertaining to the primary user channels' statistical behavior. Equation (11) is a synchronization constraint requiring at least those SUTs assigned to measure primary user channels to sense the same number of such channels. Equation (12) is a constraint requiring traffic transmission time for the set of SUTs to be positive within time slot t. Equation (13) is a primary user interference constraint, which aims to satisfy primary users' interference tolerance on the primary user wireless channels. In this case, $P_c(n,t)$ is a collision probability of channel n in time slot t. To keep the collision probability below the primary users' collision tolerance $\zeta$, the misdetection probability of channel n in time slot t can be held below this threshold $\zeta$, such that:

$$P_{MD}(n,t) \leq \zeta, \forall n \in N \tag{14}$$

Thus, the formulation with the objective established by equation (10) constrained by equations (11), (12), and (13) becomes the formulation with the objective established by equation (10) constrained by equations (11), (12), and (14).

To optimize traffic throughput in regard to cooperative sensing, scheduling component 304 can solve equation (10) as constrained by equations (11), (12) and (14) according to at least one of multiple policies. Two example policies are described below, the first is referred to as the optimal policy and the second is referred to as the short-term policy. It should be appreciated, however, that other policies known in the art or made known to one of skill in the art by way of the context provided herein are considered part of the subject disclosure.

In solving equation (10), the value function $V_t(b(t-1))$ denotes the maximum expected remaining reward that can be obtained from the beginning of time slot t given a current belief vector $b(t-1)$. The optimal policy employs reverse induction to calculate a value of the maximum expected remaining reward from two expected reward functions. The first reward function is the expected immediate reward $\tilde{R}(\alpha(t),s(t-1)=\omega)$ in the current time slot, and the second reward function is the expected future reward $V_{t+1}(T(b(t),\alpha(t),\theta(t)=z))$. The optimal policy seeks a balance between gaining maximum immediate reward and gaining maximum future reward. Incorporating these two functions into equation (10) provides that (i) When t=1, 2, ..., T-1, $$V_t(b(t-1) = m)_{a(t)}$$
$$\left\{\sum_{\omega \in \Omega^s} b_\omega(ta-1)\left[\tilde{R}(xa(t)s(t-1,)=\omega) + \sum_{\omega' \in \Omega^s} P_{\omega\omega'} \sum_{z \in Z^\theta} P\theta(t) = \right.\right.$$
$$\left. z \mid ar(t)s(t)(=,\omega')V_{t+1}(T(b(t)a(t)\theta,(t)=,z))\right]\right\}$$

subject to constraints: (11), (12), (14)
(ii) When t=T, $$V_t(b(t-1) = m)_{a(t)} \sum_{\omega \in \Omega^s} b_\omega(ta-1)\tilde{R}\left(xa(t)s\left(t-1,\right)=\omega\right)$$

subject to constraints: (11), (12), (14)
where $\tilde{R}(\alpha(t),s(t-1)=\omega)$ is given by equation (9), $P_{\omega\omega'}$ is given by equation (1), $Pr(\theta(t)=z|\alpha(t),s(t)=\omega')$ is given by equation (4), and $T(b(t),\alpha(t),\theta(t)=z)$ is given by equations (5) and (6). Accordingly, the optimal policy can be obtained as follows:

(i) When t=1, 2, ..., T-1, $$a^*(t) = \tag{15}$$
$$\underset{a(t)}{amr}\left\{\sum_{\omega \in \Omega^s} gb_\omega a(t-1)\left[x\tilde{R}\left(a(t)s\left(t-1,\right)=\omega\right) + \sum_{\omega' \in \Omega^s} P_{\omega\omega'} \sum_{z \in Z^\theta} = \right.\right.$$
$$\left. z \mid ar(t)s(t)(=,\omega')V_{t+1}(T(b(t)a(t)\theta,(t)=,z))\right]\right\}$$

subject to constraints: (11), (12), (14)
(ii) When t=T, $$a^*(t) = \underset{a(t)}{amr} b_\omega(gt-a1)\tilde{R}(ax(t)s(t,-1)=\omega) \tag{16}$$

subject to constraints: (11), (12), (14)

In at least one aspect of the subject disclosure, an incremental pruning algorithm can be employed in conjunction with solving equations (15) and (16) according to the optimal policy (e.g., see Cassandra, A., Littman, M. L., Zhang, N. L.: Incremental Pruning: A simple, Fast, Exact Method for Partially Observable Markov Decision Processes. In: Proc. 13th Conf. Uncertainty in Artificial Intelligence (UAI), Providence, R.I., pp. 54-61 (1997)).

By employing the optimal policy, cooperative spectrum sensing can be derived from equations (15) and (16). The optimal policy can become computationally complex as the number of SUTs and the number of primary user channels increases. Moreover, the optimal scheduling policy involves maintaining a data table (that can be stored e.g., in a database, see FIG. 4, infra, or other suitable data store—not depicted) specifying optimal actions for each time slot. As the time horizon over which the optimal scheduling policy calculates data increases, the amount of information stored in the data table can become large as well. In a particular aspect of the subject disclosure, complexity of the optimal policy can be mitigated by employing the optimal scheduling policy on respective subsets of the set of SUTs, or respective subsets of the primary user wireless channels, or a combination thereof. For example, the set of SUTs can be divided into multiple subgroups of SUTs. Alternatively, or in addition, the set of primary user wireless channels can be divided into multiple subgroups of wireless channels. Further, multiple POMDP algorithms comprising one or more subgroups of SUTs or one or more subgroups of wireless channels can be executed to solve equations (15) and (16) separately for the respective subgroups of SUTs or wireless channels.

As an alternative to the optimal policy, a short-term policy for cooperative spectrum sensing can be implemented and employed for solving equations (15) and (16). In this case, the scheduling policy can be expressed as follows:

$$a^*(t) = \underset{a(t)}{amr} \sum_{\omega \in \Omega^s} gb_\omega(at-1)\tilde{R}x\left(a(t)s\left(t-1,\right)=\omega\right)$$

subject to constraints: (11), (12), (14).
Thus, according to the short-term policy, CSMC 302 can focus on maximizing immediate expected reward for each time slot t. The short-term policy can still employ equations (5) and (6) to update a belief vector $b_\omega(t)$ for the wireless channels.

As described above, once scheduling component 304 selects a subset of the set of SUTs to measure a subset of the set of primary user wireless channels in time slot t (whether using the optimal policy, the short-term policy, incremental pruning, executing the scheduling algorithm on subgroups of SUTs or wireless channels, and so on), the selection is output to the SUTs, and measurements of the channels are performed in time slot t. The measurements are received and processed by measurement component 308 to identify wireless channels measured to be in an idle state for time slot t, and traffic transmissions on those wireless channels are scheduled by traffic component 310 for time slot t. ACK/NACK observations for time slot t are then received by observation component 312 which incorporates these observations into an observation vector$_t$, which is provided along with a measurement vector$_t$ and belief vector$_{t-1}$ to channel state component 314. Utilizing this information, channel state component 314 determines a belief vector$_t$ based thereon. The belief vector$_t$ is then provided to scheduling component for subsequent cooperative sensing in time t+1, and so on.

Figure 4:
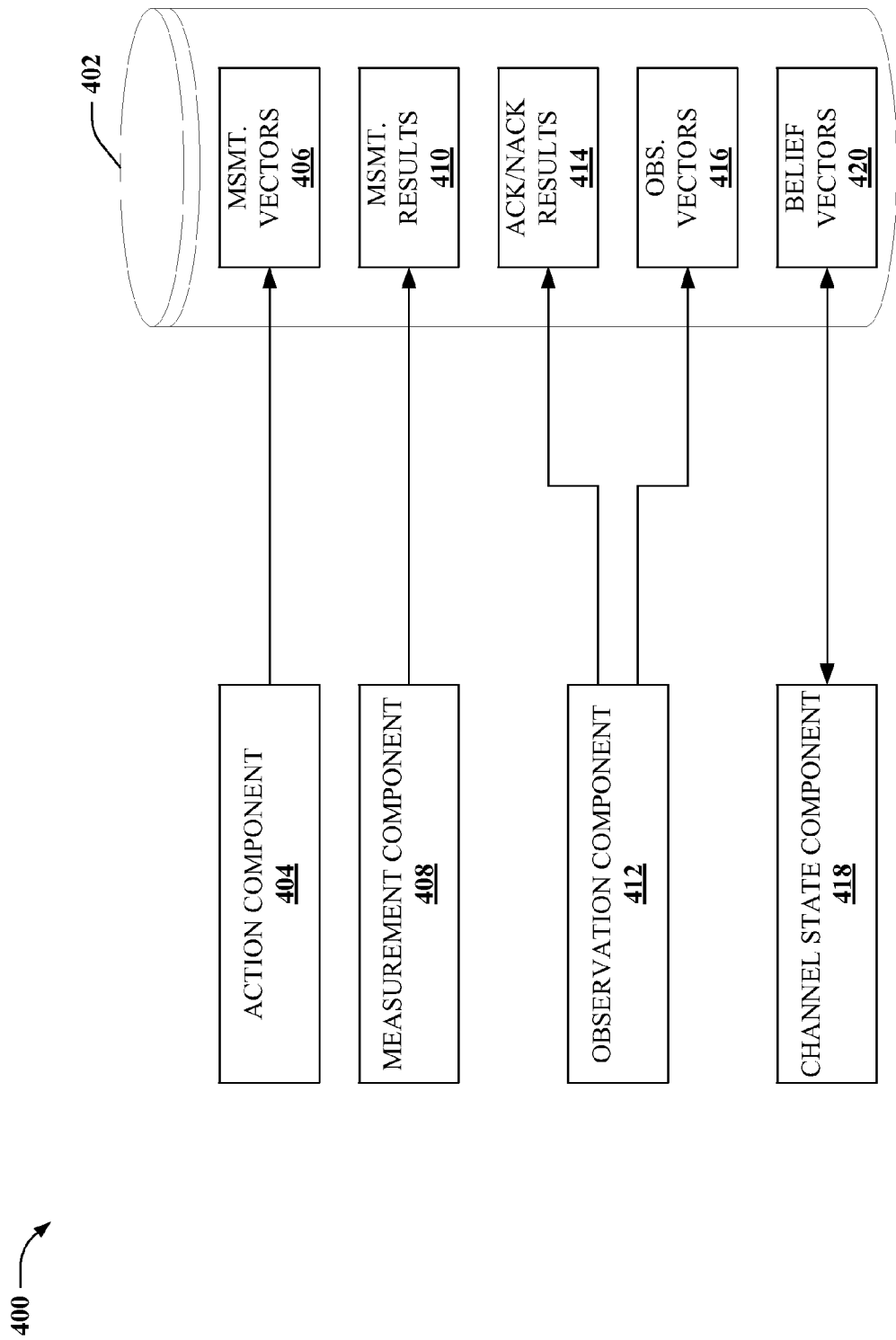
FIG. 4 depicts a block diagram of an example parameter database employed in conjunction with cooperative sensing for cognitive radio.

FIG. 4 illustrates a block diagram of an example system 400 according to additional aspects of the subject disclosure. System 400 can be employed in conjunction with a CSMC as described herein (e.g., CSMC 108, CSMC 302, CSMC 500, etc.). Particularly, system 400 includes a database 402 that stores information pertaining to component 312 which incorporates these observations into an observation vector$_t$, which is provided along with a measurement vector$_t$ and belief vector$_{t-1}$ to channel state component 314. Utilizing this information, channel state component 314 determines a belief vector$_t$ based thereon. The belief vector$_t$ is then provided to scheduling component for subsequent cooperative sensing in time t+1, and so on.

FIG. 4 illustrates a block diagram of an example system 400 according to additional aspects of the subject disclosure. System 400 can be employed in conjunction with a CSMC as described herein (e.g., CSMC 108, CSMC 302, CSMC 500, etc.). Particularly, system 400 includes a database 402 that stores information pertaining to scheduling cooperative sensing in a CR wireless communication environment. The information can be employed in conjunction with a scheduling algorithm based on one or more reward policies for improving traffic throughput for CR wireless communications. Additionally, system 400 can comprise one or more components for generating data pertaining to states of wireless channels upon which the scheduling algorithm schedules the cooperative sensing.

According to at least one aspect, system 400 can comprise an action component 404 that compiles a measurement vector based on cooperative sensing selections made by a CR base station in successive wireless time frames. These cooperative sensing selections as well as the measurement vector can be stored in a measurement vector data location 406 of database 402 for each respective time frame. In at least one aspect of the subject disclosure, the measurement vector includes sensitivity levels (e.g., misdetection probability, false alarm probability) for the cooperative sensing as well, which can also be stored at measurement vector data location 406 for respective time frames.

System 400 can further comprise a measurement component 408. Measurement component 408 receives sensing determinations of wireless channels made by SUTs and stores the measurement results for each time frame in a measurement data location 410 of database 402. Additionally, measurement component 408 can estimate an idle/busy state of the respective wireless channels, based upon these measurement results, and an idle/busy decision threshold. The estimated idle/busy state can be stored at database 402 as well.

Further, system 400 can comprise an observation component 412 that receives ACK/NACK observations from SUTs in response to traffic transmissions associated with those SUTs in respective time frames. In one aspect of the subject disclosure, the ACK/NACK results can be stored separately in an ACK/NACK data location 414 of database 402. Additionally, an observation vector compiled from the ACK/NACK results for each time frame can be stored in an observation vector data location 416 of database 402. A channel state component 418 employs a measurement vector and observation vector for a current time frame, as well as a belief vector describing state probabilities for the wireless channels from a prior time frame, to calculate current belief vectors for each time frame. The current belief vectors can be stored in a belief vector data location 420, also as a function of respective wireless time frames.

Database 402 therefore serves as a repository for statistical behavior information for wireless channels associated with a CR wireless environment. The statistical behavior information is stored as a function of wireless time frames to enable determination of channel state probabilities, and to optimize scheduling decisions for particular time frames. As data accumulates, a particular time horizon over which channel state estimation calculations are performed will increase, which can be utilized for instance in conjunction with the optimal reward policy described at FIG. 3, supra.

Figure 5:
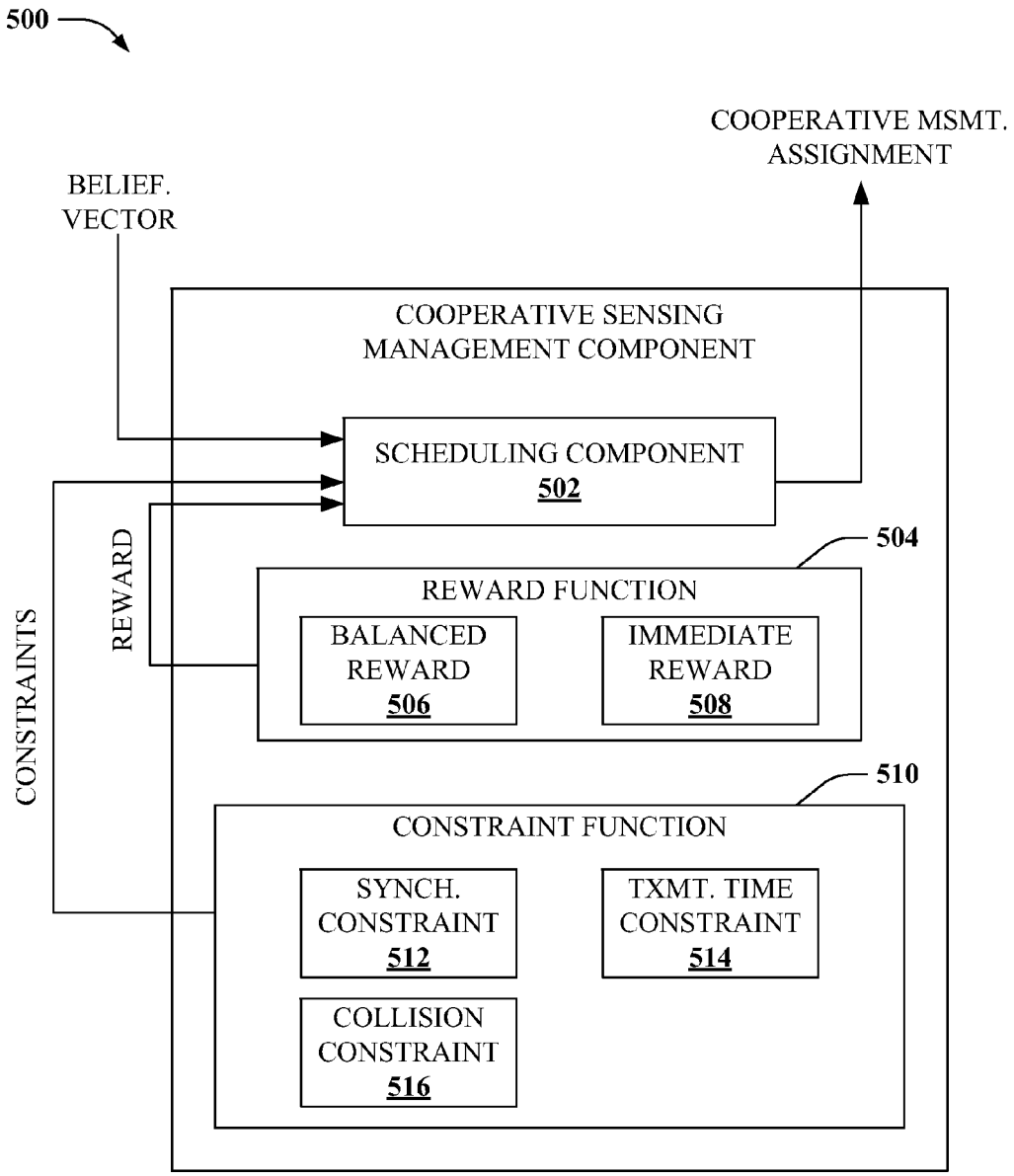
FIG. 5 depicts a block diagram of a sample system that employs various reward functions and constraints for implementing cooperative sensing.

FIG. 5 illustrates a CSMC 500 according to one or more additional aspects of the subject disclosure. CSMC 500 depicts an example implementation of various reward policies and constraint functions utilized in cooperative scheduling determinations. Particularly, CSMC 500 can comprise a scheduling component 502 that receives a belief vector describing idle/busy state probabilities for a set of wireless channels observable by CSMC 500. Additionally, a reward function 504 can provide a selected reward policy for optimizing cooperative sensing decisions based on a wireless system state defined by the belief vector. As described herein, reward function 504 can comprise a balanced reward 506, which seeks to optimize expected immediate reward with expected future reward for scheduling decisions that return a verified channel idle state result. As the time horizon over which the scheduling decisions are calculated increases, the complexity of scheduling decisions can burden processing capabilities of CSMC 500. In such a case, an immediate reward 508 can be employed that prioritizes maximum immediate reward over maximum future reward, reducing this time horizon and the associated calculation complexity.

Further to the above, CSMC 500 can comprise a constraint function 510 that provides one or more constraints for cooperative scheduling decisions performed by scheduling component 502. Examples of such constraints can comprise a synchronization constraint 512 that requires a set of SUTs assigned to sense a wireless channel to sense a common number of such channels, or sense channels for a common duration. A transmission time constraint 514 can be imposed on scheduling decisions to ensure that a sensing duration is capped to leave at least some time for traffic transmissions within a wireless time frame. Additionally, a collision constraint 516 can be imposed that establishes a collision probability to be below a collision threshold of primary user equipment employing the wireless channels. In at least one aspect, a combination of the foregoing constraints can be imposed on scheduling decisions, in addition to one or more reward policies provided by reward function 504.

Figure 6:
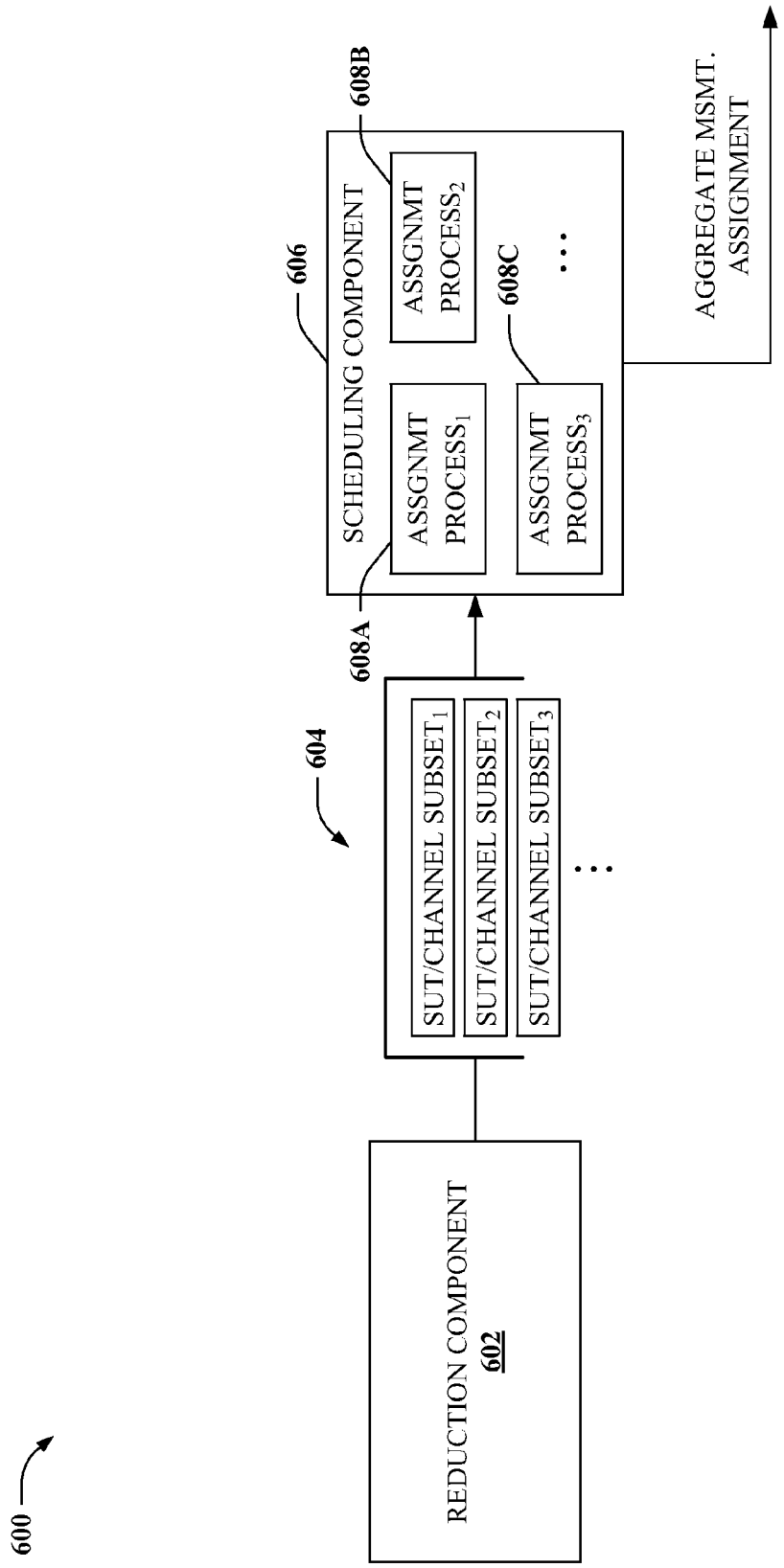
FIG. 6 illustrates a block diagram of an example wireless time slot and wireless activity involved in cooperative sensing employed for cognitive radio.

FIG. 6 illustrates a block diagram of an example system 600 for reducing complexity in scheduling decisions for CR wireless communications according to various aspects of the subject disclosure. System 600 can comprise a reduction component 602 that separates a set of SUTs into multiple subsets of SUTs and separates a set of primary user wireless channels related to the CR wireless communications into multiple subsets of the wireless channels. The subsets of SUTs or wireless channels are depicted at 604, and can include any suitable number of these subsets. For instance, the subsets of SUTs or wireless channels 604 can include SUT/channel subset$_1$, SUT/channel subset$_2$, SUT/channel subset$_3$, ..., and so on.

The subsets 604 are provided to a scheduling component 606, which can be employed as part of a CSMC as described herein, for scheduling cooperative sensing of respective subsets of wireless channels by respective subsets of the SUTs. Particularly, scheduling component 606 can execute multiple assignment processes for selecting subsets of the SUTs to sense respective subsets of wireless channels. The processes can include assignment process$_1$ 608A, assignment process$_2$ 608B, assignment process$_3$, ..., and so forth. By executing the assignment processes separately for respective subsets of SUTs and subsets of wireless channels, processing complexity involved in scheduling large numbers of SUTs to measure a large number of wireless channels can be alleviated significantly. This can reduce time in executing the assignment processes, particularly where scheduling component 606 is equipped to run the respective processes in parallel. Once the assignment processes are complete, scheduling component 606 outputs an aggregate cooperative sensing assignment to the respective SUTs to conduct the sensing on assigned wireless channels, as described herein.

The aforementioned systems have been described with respect to interaction between several components and/or wireless communication entities. It should be appreciated that such systems and components can include those components or sub-components specified therein, some of the specified components or sub-components, and/or additional components. For example, a system could include CSMC 302, CR base station 102, primary user equipment 106 and SUTs 104A-104C, or a different combination of these or other entities. Sub-components could also be implemented as modules communicatively coupled to other modules rather than included within parent modules. Additionally, it should be noted that one or more components could be combined into a single component providing aggregate functionality. For instance, measurement component 308 can include traffic component 310, or vice versa, to facilitate receiving SUT channel sensing results and scheduling traffic transmissions based on those results, by way of a single component. The components can also interact with one or more other components not specifically described herein but known by those of skill in the art.

Figure 7:
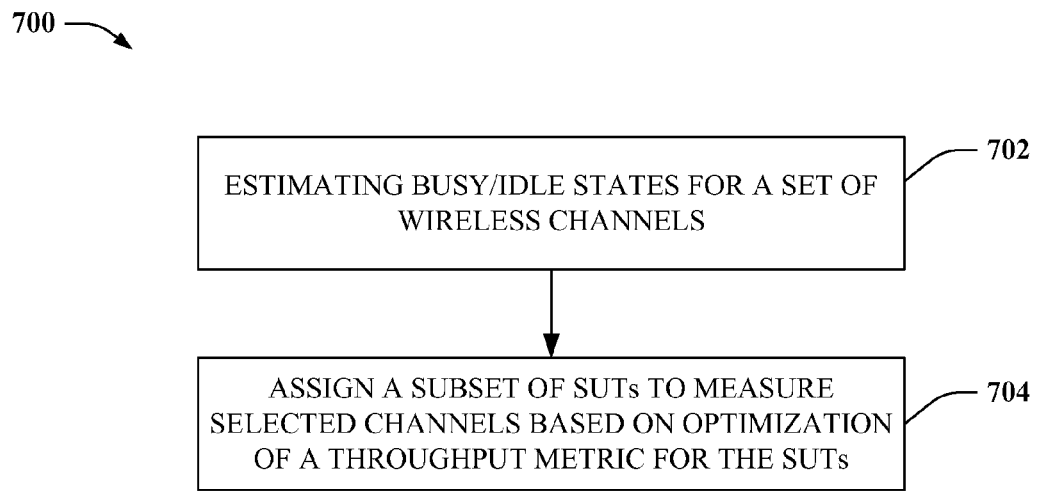
FIG. 7 depicts a flowchart of a sample method for providing cooperative sensing in cognitive radio wireless communications.
Figure 8:
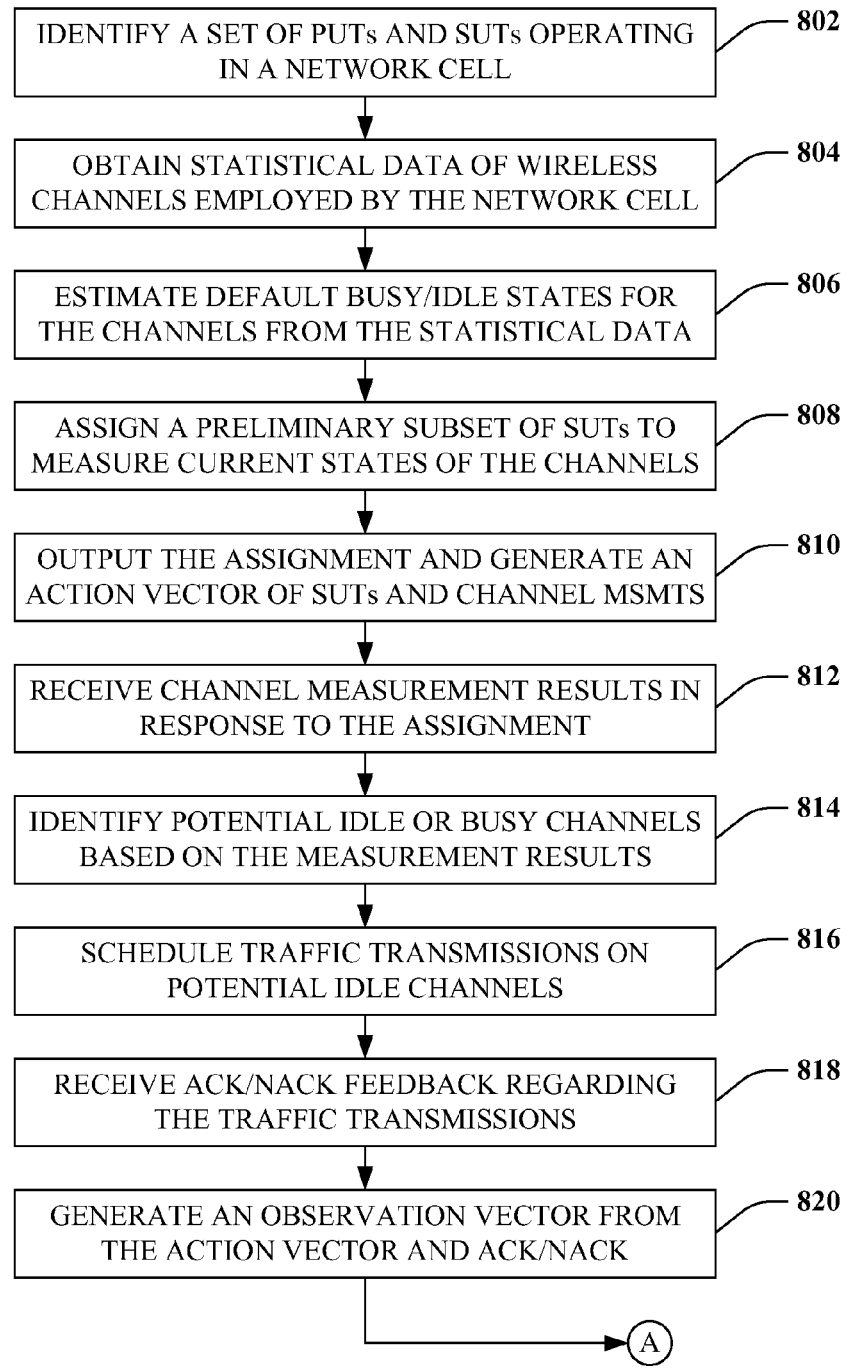
FIGS. 8 and 9 depict a flowchart of an example method for providing cooperative sensing according to a throughput optimization constraint.
Figure 9:
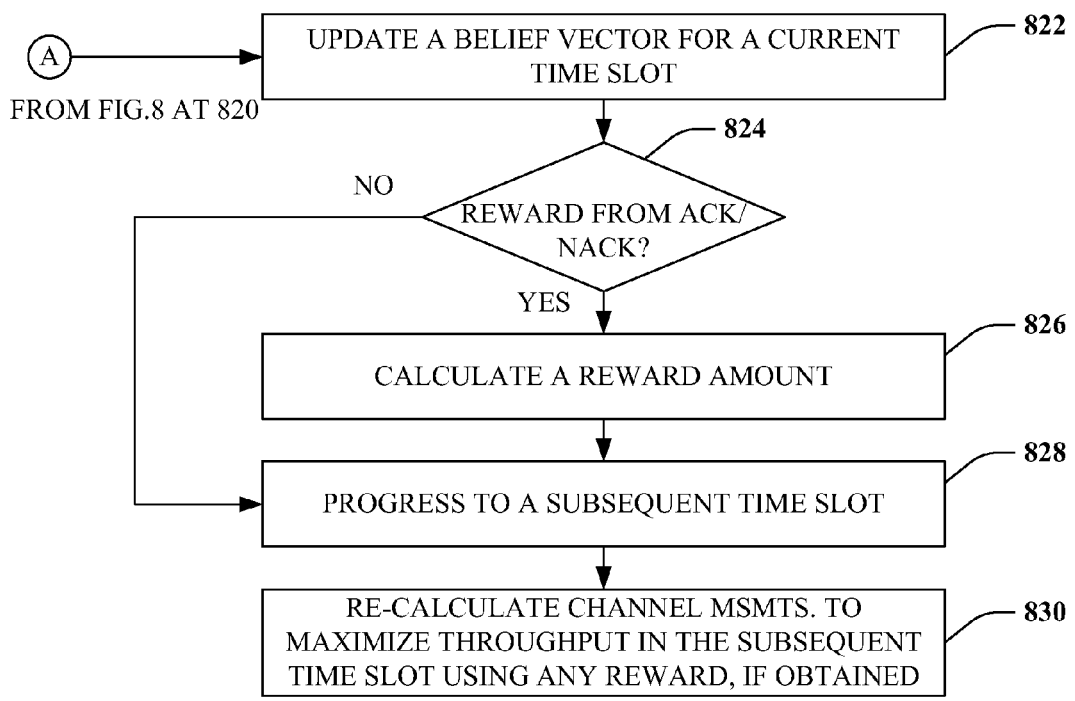

FIGS. 7, 8, and 9 illustrate various methods in accordance with one or more of the various embodiments disclosed herein. While, for purposes of simplicity of explanation, the methods are shown and described as a series of acts, it is to be understood and appreciated that the various embodiments are not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the various embodiments. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

FIG. 7 illustrates a flowchart of an example method 700 for providing cooperative sensing management in a CR wireless communication environment, according to particular aspects of the subject disclosure. At 702, method 700 can comprise estimating busy/idle states for a set of primary user wireless channels from prior channel information pertaining to the set of wireless channels. In one example, for instance, the estimating can be based on long-term statistical data reflecting changes in idle/busy states for one or more of the channels over time. In another example, the estimating can be based on recent idle/busy state estimates of the wireless channels, such as from one or more previous wireless time frames. According to a particular example, the estimating can also comprise traffic-based feedback information indicating whether a collision has occurred on one or more of the wireless channels.

At 704, method 700 can comprise assigning at least a subset of SUTs operating within a network cell to measure selected ones of the wireless channels. Moreover, this assigning can be based at least in part on optimization of a data traffic throughput metric for the set of SUTs. This optimization can employ the estimates of busy/idle states for respective wireless channels, in some aspects. In additional aspects, the estimates can also be based on prior scheduling decisions, including prior SUT-wireless channel sensing assignments, and equipment sensitivity settings of the one or more SUTs. In further aspects, the estimates can also be based on the traffic-based feedback information pertaining to existence of collisions in one or more prior wireless time frames. By employing the data traffic throughput metric as an optimization setting, method 700 can attempt to ensure a minimum amount of traffic transmissions for the set of SUTs in a given wireless time frame, and also seek to optimize sensing accuracy of the respective wireless channels.

FIGS. 8 and 9 depict a flowchart of a sample method 800 according to still other aspects of the subject disclosure. At 802, method 800 can comprise identifying a set of primary user equipment operating within a network cell. At 804, method 800 can comprise obtaining statistical data pertaining to wireless channels employed by the network cell. At 806, method 800 can comprise estimating default busy/idle states for the wireless channels from the statistical data. At 808, method 800 can comprise assigning a preliminary subset of SUTs to sense current idle or busy states of one or more of the wireless channels. At 810, method 800 can comprise outputting the assignment and generating an action vector of SUTs and channel measurements, as well as a misdetection probability or false alarm probability employed to tune the sensing equipment of respective SUTs.

At 812, method 800 can comprise receiving channel measurement results for the wireless channels in response to the assignment. At 814, method 800 can comprise identifying potential idle or busy channels based on the measurement results. At 816, method 800 can comprise scheduling traffic transmissions on one or more of the potential idle channels. At 818, method 800 can comprise receiving ACK/NACK feedback regarding the traffic transmissions, and at 820, method 800 can comprise generating an observation vector from the action vector and the ACK/NACK feedback. From 820, method 800 proceeds to 822 at FIG. 9.

At 822, method 800 can comprise updating a belief vector representing current idle/busy states of the wireless channels in a current time slot, from the observation vector and the action vector. At 824, a determination is made as to whether a reward is added to scheduling optimization based on a reward policy and the ACK/NACK feedback. If the reward is obtained, method 800 can proceed to 826. Otherwise, method 800 proceeds to 828.

At 826, method 800 can comprise calculating a reward amount. At 828, method 800 can comprise progressing to a subsequent wireless time slot. At 830, method 800 can comprise re-calculating channel measurement assignments based on a reward policy to maximize traffic throughput for the SUTs in a subsequent time slot. The re-calculating incorporates any reward received according to the reward policy and the ACK/NACK feedback.

Figure 10:
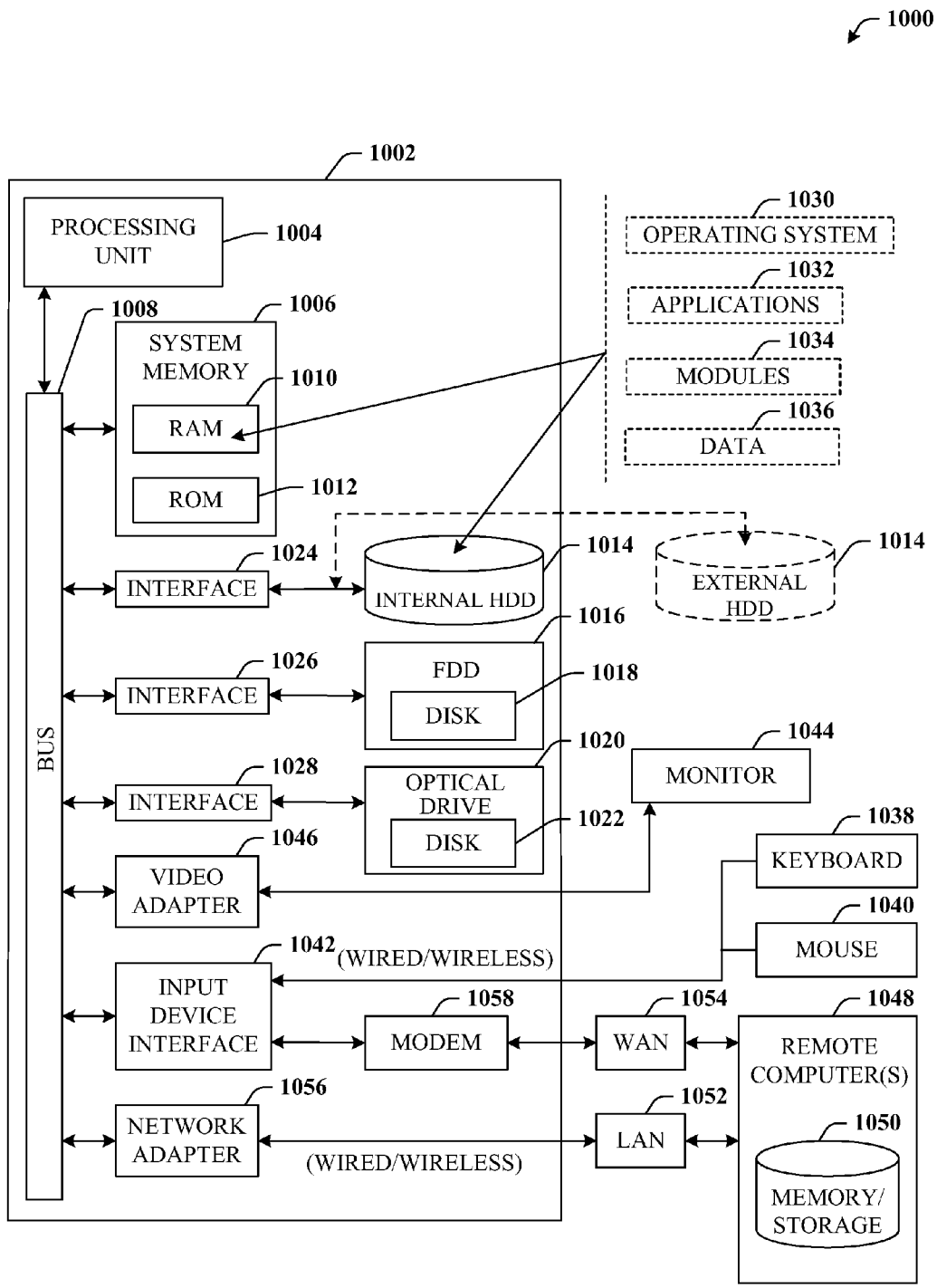
FIG. 10 illustrates a block diagram of an example computer operable to execute at least some aspects of the disclosed systems or methods.

Referring now to FIG. 10, there is illustrated a block diagram of an exemplary computer system operable to execute aspects of the disclosed subject matter. In order to provide additional context for various aspects of the various embodiments, FIG. 10 and the following discussion are intended to provide a brief, general description of a suitable computing environment 1000 in which the various aspects of the various embodiments can be implemented. Additionally, while the various embodiments described above may be suitable for application in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Continuing to reference FIG. 10, the exemplary environment 1000 for implementing various aspects of one or more of the various embodiments includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multiprocessor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the various embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the various embodiments can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11(a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
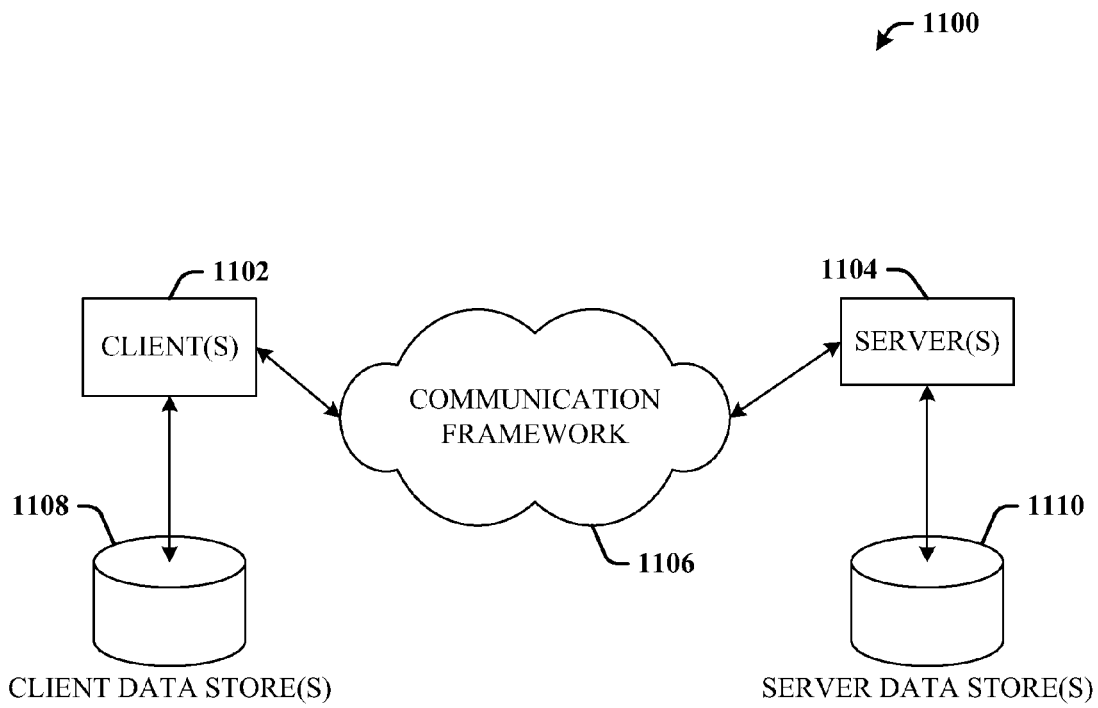
FIG. 11 illustrates a block diagram of an exemplary electronic communication environment according to additional aspects.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the various embodiments, for example.

The system 1100 also includes one or more server(s) 1104. The server(s) 1104 can also be hardware and/or software (e.g., threads, processes, computing devices). The servers 1104 can house threads to perform transformations by employing the various embodiments, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methods for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method of wireless communication, comprising:
estimating busy or idle states for a set of wireless channels from prior channel information pertaining to the set of wireless channels; and
assigning at least a subset of secondary user terminals (SUTs) in connection with measuring selected ones of the wireless channels as part of multi-user cooperative sensing in cognitive radio (CR) wireless communication, wherein the assigning is based at least in part on a function of a data traffic throughput metric for the at least the subset of SUTs that employs the busy or idle states.

2. The method of claim 1, further comprising:
receiving measurement results of the wireless channels in response to the assigning;
assigning data traffic for one or more of the at least the subset of SUTs based at least in part on the measurement results; and
receiving or inferring traffic feedback results pertaining to the data traffic, wherein the traffic feedback results are employed for assigning SUT measurement of the wireless channels in a subsequent time frame.

3. The method of claim 1, further comprising:
employing traffic feedback results, channel measurement assignment information, channel measurement results, or long-term statistical behavior of the set of wireless channels from a previous time frame for estimating the busy or idle states of the set of wireless channels in a current time frame; and
as a function of the estimated busy or idle states, identifying the subset of SUTs and selected wireless channels that improve the data traffic throughput metric at least for the current time frame.

4. The method of claim 3, wherein the identifying is subject to a primary user terminal (PUT) interference constraint to mitigate SUT data traffic collisions with PUTs.

5. The method of claim 3, wherein the identifying includes imposing a fixed per-channel measurement duration on the measuring of the selected ones of the wireless channels.

6. The method of claim 3, wherein the identifying includes measuring, by respective SUTs of the subset of SUTs, an equivalent number of the wireless channels.

7. The method of claim 3, wherein the identifying is subject to a positive data traffic time constraint to limit a size of respective subsets of the wireless channels.

8. The method of claim 3, further comprising:
modeling busy or idle probability states of the wireless channels in a prior time with a belief vector, including inferring the busy or idle probability states at least in part from the long-term statistical behavior, or determining the busy or idle probability states at least in part from prior traffic feedback results; and
estimating the busy or idle states for the current time based on the belief vector from the prior time.

9. The method of claim 8, wherein the inferring includes inferring the busy or idle states in part from an aggregate of multiple previous probability states including limiting a number of the multiple previous probability states for the aggregate.

10. The method of claim 8, wherein the inferring the busy or idle states for the current time includes applying a Markov property in which current busy or idle states for a current time frame depend on previous busy or idle states from a previous time frame, and traffic feedback results or channel measurement results from the previous time frame.

11. The method of claim 8, further comprising implementing an OR rule for inferring the busy or idle states, the OR rule comprising:
setting a busy or idle probability state for the wireless channel to busy, in response to channel measurement results indicating that any of the SUTs measures a wireless channel as busy and
setting a busy or idle probability state for the wireless channel to idle, in response to the channel measurement results indicating that all of the SUTs measure the wireless channel as idle.

12. The method of claim 3, wherein the identifying includes determining a misdetection probability for the SUTs based on a set of discrete values corresponding to spectrum sensing equipment employed by the subset of SUTs.

13. The method of claim 3, wherein the identifying includes determining a false alarm probability for the SUTs derived from a predetermined misdetection probability.

14. The method of claim 13, wherein the predetermined misdetection probability satisfies a condition relative to a target primary channel collision probability.

15. The method of claim 3, wherein the identifying includes determining a constant misdetection probability or a constant false alarm probability for one channel of the set of wireless channels to be utilized by any SUT assigned to measure the one channel.

16. The method of claim 3, wherein the identifying includes at least one of:
increasing a number of SUTs used for measuring a wireless channel to increase measurement accuracy pertaining to the wireless channel; or
decreasing the number of SUTs used for measuring the wireless channel in response to measurement accuracy of the wireless channel being above a target accuracy.

17. The method of claim 3, wherein the assigning the subset of the SUTs includes maximizing a reward for successful identification of an idle state for one or more of the set of wireless channels.

18. The method of claim 17, wherein the maximizing the reward further comprises determining a maximum expected remaining reward obtained at a beginning of a current time slot utilizing a belief vector updated from a previous time slot.

19. The method of claim 17, wherein maximizing the reward further comprises balancing an expected immediate reward for a current time slot with an expected future reward of a subsequent time slot.

20. The method of claim 17, wherein the maximizing the reward further comprises dividing the set of wireless channels into multiple subsets of channels or subdividing the subset of SUTs into multiple further subsets, and estimating a belief vector state for the current time frame separately for respective subsets of wireless channels or further subsets of SUTs.

21. The method of claim 17, wherein maximizing the reward further comprises maximizing expected immediate reward for each time frame.

22. A system, comprising:
- a channel state component configured to estimate respective idle or busy states of wireless channels observable within a range of a cognitive radio base station for an existing wireless time slot; and
- a scheduling component configured to select, subject to a data traffic throughput constraint for secondary user terminals (SUTs), a subset of the SUTs to perform idle or busy state measurements on a subset of the wireless channels as part of a cooperative channel sensing arrangement for cognitive radio.

23. The system of claim 22, further comprising an action component configured to generate a measurement vector comprised at least in part from the selection of the subset of the SUTs, wherein the action component is configured to provide the channel state component with a prior measurement vector for a prior wireless time slot to facilitate estimation of the idle or busy state measurements for an existing wireless time slot.

24. The system of claim 22, further comprising a measurement component configured to record the idle or busy state measurements performed by the subset of the SUTs and identify one or more of the wireless channels likely to be in an idle state according to the idle or busy state measurements, or one or more of the wireless channels likely to be in a busy state according to the idle or busy state measurements.

25. The system of claim 24, further comprising a traffic component configured to schedule uplink or downlink traffic for at least one SUT on at least one of the one or more of the wireless channels likely to be in an idle state.

26. The system of claim 25, further comprising an observation component configured to receive or infer acknowledgment (ACK) or negative acknowledgment (NACK) responses from the at least one SUT, and configured to at least one of:
- establish an idle state for the at least one of the one or more wireless channels in response to receiving an ACK for the uplink or downlink traffic; or
- establish a busy state for the at least one of the one or more wireless channels in response to receiving or inferring a NACK for the uplink or downlink traffic.

27. The system of claim 26, wherein the observation component is further configured to establish a third state for the at least one of the one or more wireless channels likely to be in the busy state according to the channel measurements, or establishes a fourth state for the at least one of the one or more wireless channels that are not measured by SUTs according to the selection of the scheduling component, and further wherein the observation component is configured to update the channel state component with idle state, busy state, third state and fourth state information.

28. The system of claim 27, wherein the channel state component is configured to estimate the respective idle or busy states for an existing time slot based at least in part on idle or busy probability states of the wireless channels in a previous time slot, channel measurement selections of the scheduling component in the existing time slot, or channel state information provided by the observation component in the existing time slot.

29. The system of claim 22, wherein the scheduling component is configured to impose a synchronization constraint on the selection that requires each SUT of the subset of the SUTs to measure an identical number of the wireless channels.

30. The system of claim 22, wherein the scheduling component is configured to impose a transmission time constraint on the selection that requires a minimum time for uplink or downlink traffic transmissions for the SUTs in an existing time frame.

31. The system of claim 22, wherein the scheduling component is configured to impose a collision constraint on the selection that mitigates channel collisions between SUT traffic and primary user terminal traffic on the wireless channels.

32. The system of claim 22, wherein the scheduling component is configured to employ a reward function on the selection to meet the data traffic throughput constraint.

33. The system of claim 32, wherein the reward function is configured to increase a probability of identifying an idle state wireless channel for which an ACK is received.

34. The system of claim 33, wherein the reward function imposes a balance on increasing estimated immediate reward for the existing time slot and increasing estimated future reward for one or more subsequent time slots to satisfy the data traffic throughput constraint.

35. The system of claim 32, wherein the scheduling component is configured to employ an incremental pruning algorithm to limit complexity of channel state estimation over multiple channel time slots utilized for the selection.

36. The system of claim 32, further comprising a reduction component configured to separate the SUTs into multiple SUT subgroups or separate the wireless channels into multiple wireless channel subgroups and further wherein at least one of:
- the channel state component is configured to estimate respective idle or busy states for the multiple channel subgroups separately; or
- the scheduling component is configured to execute an assignment algorithm that maximizes the data traffic throughput constraint separately for the multiple SUT subgroups or separately for the multiple channel subgroups.

37. The system of claim 32, wherein the reward function is configured to prioritize increasing estimated immediate reward over increasing estimated future reward to satisfy the data traffic throughput constraint.

38. A system for wireless communication, comprising:
- means for modeling busy or idle state probabilities of a set of wireless channels from energy measurements of respective wireless channels; and
- means for selecting user terminals (UTs) to measure current busy or idle states of a subset of the wireless channels as part of multi-user cooperative channel sensing based at least in part on a data traffic throughput function and the busy or idle state probabilities, wherein the user terminals are secondary user terminals in regard to the set of wireless channels.

39. The system of claim 38, further comprising:
- means for receiving measurement results pertaining to the current busy or idle states of the subset of the wireless channels in response to selecting the user terminals;
- means for conditionally identifying at least one of the subset of the wireless channels being in an idle state from the measurement results;
- means for assigning uplink or downlink traffic for at least one of the UTs on the at least one of the subset of the wireless channels;
- receiving or inferring (i.e., no ACK is received) traffic feedback pertaining to the data traffic; and
- means for verifying an idle state or a busy state of the at least one of the subset of the wireless channels based at least in part on the traffic feedback.

40. The system of claim 38, further comprising:
means for estimating the busy or idle states of the set of wireless channels in a current time frame from traffic feedback, UT measurement selection information, wireless channel measurement results, or long-term statistical behavior of the set of wireless channels, or a combination thereof; wherein:
the means for selecting the UTs performs the selection as a function of the estimated busy or idle states utilizing a statistical reward function that improves the data traffic throughput metric at least for the current time frame.

41. Computer readable instructions stored on a non-transitory computer-readable medium, the computer readable instructions are configured to cause a computer to:
estimate busy or idle states for a set of wireless channels from prior channel information pertaining to the set of wireless channels; and
assign at least a subset of secondary user terminals in connection with measuring selected ones of the wireless channels as part of multi-user cooperative sensing in cognitive radio (CR) wireless communication, wherein assignment of respective secondary user terminals to respect wireless channels is a function of a traffic throughput metric for the secondary user terminals that employs the busy or idle states.

\* \* \* \* \*